United States Patent
Dingman et al.

(10) Patent No.: US 12,286,039 B2
(45) Date of Patent: Apr. 29, 2025

(54) ROTATING CHILD CAR SEAT WITH BELT AND TETHER TENSIONER AND RECLINING FRAME

(71) Applicant: Cybex GmbH, Bayreuth (DE)

(72) Inventors: Guy Dingman, Idaville, IN (US); Alexander Douglas Goare, Concord, CT (US); Lyle James, Kettering, OH (US); James Meehan, Charlotte, NC (US)

(73) Assignee: CYBEX GmbH, Bayreuth (DE)

( * ) Notice: Subject to any disclaimer, the term of this patent is extended or adjusted under 35 U.S.C. 154(b) by 172 days.

(21) Appl. No.: 17/845,567

(22) Filed: Jun. 21, 2022

(65) Prior Publication Data

US 2022/0402413 A1 Dec. 22, 2022

Related U.S. Application Data

(60) Provisional application No. 63/212,913, filed on Jun. 21, 2021.

(51) Int. Cl.
*B60N 2/28* (2006.01)

(52) U.S. Cl.
CPC ......... *B60N 2/2875* (2013.01); *B60N 2/2809* (2013.01); *B60N 2/2821* (2013.01); *B60N 2/2878* (2013.01)

(58) Field of Classification Search
CPC .. B60N 2/2875; B60N 2/2809; B60N 2/2821; B60N 2/2878
See application file for complete search history.

(56) References Cited

U.S. PATENT DOCUMENTS

| | | | |
|---|---|---|---|
| 8,348,337 B2 | 1/2013 | Franck et al. | |
| 8,419,129 B2 | 4/2013 | Inoue et al. | |
| 8,459,739 B2 | 6/2013 | Tamanouchi et al. | |
| 8,845,022 B2 | 9/2014 | Strong et al. | |
| 9,187,016 B2 | 11/2015 | Strong et al. | |
| 9,403,449 B2 | 8/2016 | Longenecker et al. | |
| 9,937,823 B2 | 4/2018 | Williams et al. | |
| 9,963,051 B2 | 5/2018 | Strong et al. | |
| 10,099,580 B2 | 8/2018 | Anderson et al. | |
| 10,189,381 B2 | 1/2019 | Williams et al. | |
| 10,406,947 B2 | 9/2019 | Anderson et al. | |
| 10,457,168 B2 | 10/2019 | Anderson et al. | |
| 10,688,892 B2 | 6/2020 | Anderson et al. | |
| 10,723,245 B2 | 7/2020 | Anderson et al. | |
| 11,584,267 B2 * | 2/2023 | Longenecker | B60N 2/2869 |
| 2006/0170262 A1 * | 8/2006 | Gold | B60N 2/2875 |
| | | | 297/256.12 |

* cited by examiner

*Primary Examiner* — Syed A Islam
(74) *Attorney, Agent, or Firm* — Schwegman Lundberg & Woessner, P.A.

(57) ABSTRACT

Disclosed herein are child car seats configured to be installed in an associated vehicle using a safety belt of the associated vehicle and a top tether. The child car seat includes a seat shell supported on a base and at least one of a tensioner mechanism and a recline frame. The tensioner mechanism, which may include a panel, is configured to engage and tension each of the safety belt of the associated vehicle and the tether. The recline frame operatively attaches the seat shell to the base such that each of the seat shell and the recline frame are rotatably supported on the base, and the recline frame is further configured to permit the seat shell to recline with respect to the base.

20 Claims, 15 Drawing Sheets

ROTATING CHILD CAR SEAT WITH BELT AND TETHER TENSIONER AND RECLINING FRAME

CROSS-REFERENCE TO RELATED APPLICATIONS

This application claims the benefit of U.S. Provisional Application No. 63/212,913, filed on Jun. 21, 2021, and entitled "Rotating Child Car Seat with Belt and Tether Tensioner and Reclining Frame," which is incorporated herein by reference in its entirety.

TECHNICAL FIELD

The present disclosure relates generally to car seats for use in motor vehicles. More particularly, the present disclosure relates to car seats comprised of at least one (a) of a tensioner mechanism configured to engage and tension each of a safety belt of the associated vehicle and a tether within a cavity of the base, and (b) a recline frame operatively attaching the seat shell to the base such that each of the seat shell and the recline frame are rotatably supported on the base and the seat shell being reclinable with respect to the base.

BACKGROUND

In the United States, child car seats are required by law and recommended for children of certain ages or sizes. There are many types of car seats available for purchase. Child car seats generally include a plastic shell with a cushioned seat formed over the shell. A safety belt of the vehicle (e.g., a lap belt existing in the vehicle) and/or a tether is generally used to securely install and mount the car seat in the vehicle. In this field, safety is of utmost concern and proper installation is critical to ensure proper performance. Installation of child car seats using an existing safety belt of a vehicle (e.g., a lap belt of the vehicle) and/or tether typically require substantial force to adequately tension the safety belt or tether, which many users find unnecessarily difficult. If both an existing safety belt and a tether are employed, the safety belt is conventionally tensioned and the tether is installed thereafter.

It would be desirable to provide a child car seat with a tensioner mechanism (e.g., in the form of a panel) configured to engage and tension each of a safety belt of the associated vehicle and a tether, such as within the base (e.g., within a cavity of the base). Such a tensioner mechanism may simultaneously engage and tension each of the safety belt of the associated vehicle and the tether. Such a tensioner mechanism may further desirably decrease the potential for improper, unsafe, or otherwise undesirable installation (e.g., installation with insufficient tensioning of the safety belt or the tether).

It would further be desirable to provide a child car seat with a recline frame operatively attaching the seat shell to the base such that each of the seat shell and the recline frame are rotatably supported on the base and the seat shell being reclinable with respect to the base. In particular, it would be desirable to provide a recline frame with upper and/or lower linear tracks, such that translation therealong allows the seat shell to recline with respect to the base, thereby changing the angle of the seating surface. Such a recline frame may further desirably provide a simpler and/or improved reclination method for changing the angle of the seating surface than the type of arcuate or non-linear tracks conventionally employed.

BRIEF SUMMARY

Disclosed herein are child car seats configured to be installed in an associated vehicle. The car seats may be installed in the vehicle using a safety belt of the vehicle (e.g., an existing lap belt of the vehicle) and/or a top tether. The car seat may be comprised of a seat shell (which may also be referred to as a seat bucket) supported on a base. The car seat may further comprise at least one of (a) a tensioner mechanism, and (b) a recline frame. The tensioner mechanism may be configured to engage and tension at least one of the safety belt and the tether. Tensioning the safety belt and/or the tether may generally ensure proper installation and mounting of the car seat in the vehicle. The recline frame may operatively attach the seat shell to the base such that each of the seat shell and the recline frame are rotatably supported on the base. The recline frame may be further configured to permit the seat shell to recline with respect to the base.

In accordance with the foregoing, disclosed in examples herein relate to child car seats. In accordance with particular examples of the present disclosure, an exemplary child car seat comprises: a seat shell supported on a base; and a tensioner mechanism configured to engage and tension each of the safety belt of the associated vehicle and the tether. The tensioner mechanism may, in certain constructions, be configured to engage and tension each of the safety belt of the associated vehicle and the tether within at least one of the seat shell and the base (e.g., within a cavity defined by the base). This may advantageously decrease the potential for an improper, unsafe, or otherwise undesirable installation. The tensioner mechanism may be movable between first and second positions. In the first position, the tensioner mechanism may not engage or tension either of the safety belt of the associated vehicle and the tether. In the second position, the tensioner mechanism may engage and tension each of the safety belt of the associated vehicle and the tether.

In accordance with examples of the disclosure, the base may define a cavity. The cavity may be configured to receive the safety belt of the associated vehicle and the tether therein. The tensioner mechanism may be pivotally attached to the base so that it is rotatable between the first and second positions relative to the base. In certain constructions, the tensioner mechanism may be a panel. The panel may at least partially cover the cavity in the second position. The panel may have a proximate end attached to the base and a distal end opposite the proximal end. The base may include a receiving portion interfacing with the seat shell. The base may further include a backing portion extending upwardly from the receiving portion. The panel may define at least a portion of the backing portion in the second position. In the first position, the panel may be pivoted away from the backing portion of the base. As a result, a distal end of the panel may be spaced apart from the backing portion of the base. In the second position, the distal end of the panel may be contiguous with the backing portion of the base. The panel may be positioned substantially flush with the backing portion of the base. As a result, the panel and the backing portion may collectively provide a substantially smooth backing surface.

In certain constructions, an aperture may be defined at an upper end of the backing portion. The tether may pass through the aperture and extend into a cavity defined by the base. The cavity may be configured to receive the safety belt of the associated vehicle and the tether therein.

In accordance with particular examples of the present disclosure, the seat shell may be rotatably supported on the base. As a result, the seat shell may be selectively positionable on the base in at least a rearward-facing position and a forward-facing position. The tensioner mechanism may be generally accessible and capable of being selectively moved between the first and second positions when the seat shell is in the rearward-facing position. The tensioner mechanism may be generally inaccessible and incapable of being selectively moved between the first and second positions when the seat shell is in the forward-facing position. Each of the safety belt of the associated vehicle and the tether may be configured to remain stationary as the seat shell is rotated with respect to the base.

In certain constructions, the child car seat may further include a recline frame. The recline frame may operatively attach the seat shell to the base. As a result, each of the seat shell and the recline frame may be rotatably supported on the base and selectively positionable on the base in at least a rearward-facing position and a forward-facing position. The recline frame may be further configured to permit the seat shell to recline with respect to the base. The recline frame may, in particular examples, include a pair of upper linear tracks. Each of the upper linear tracks may be configured to receive an upper recline structure (such as a rod) of the seat shell therein. The upper recline structure may be adapted for linear translation along each of the upper linear tracks as the seat shell is reclined with respect to the base. The recline frame may, in particular examples, include a pair of lower linear tracks. Each of the lower linear tracks may define a plurality of openings configured to selectively receive a lower recline structure (such as a rod) of the seat shell therethrough for selectively positioning the seat shell in a discrete recline position.

In accordance with examples of the present disclosure, a portion of the tether, such as the proximal end of the tether) may be anchored to the seat shell and/or to the base. In certain constructions in which a portion of the tether is anchored to the seat shell, the tensioner mechanism may be pivotally attached to the seat shell. The tensioner mechanism may be rotatable between the first and second positions relative to the seat shell. In certain constructions, the attached portion of the tether may be attached to an anchor portion, such as a bar, of the tensioner mechanism that is positioned within the cavity of the base. As a result, the anchor portion and tether may be displaced toward a forward end of the base as the tensioner mechanism is moved from the first position to the second position. As a further result, the anchor portion may be displaced away from the forward end of the base as the tensioner mechanism is moved from the second position to the first position. In certain constructions, the anchor portion may be operatively connected to the base by a pair of extension springs. Each of the extension springs may be configured to bias the bar away from the forward end of the base. Each of the extension springs may be further configured to expand as the tensioner mechanism is moved from the first position to the second position.

In accordance with other constructions, the top tether may be attached to an anchor structure on the base that does not move when the tensioner mechanism is moved between the first and second positions. The tensioner mechanism may displace a portion of the tether that is positioned more rearward than the anchor structure when the tensioner mechanism is moved from the first position to the second position.

In accordance with examples of the disclosure, in the second position, the tensioner mechanism may engage and tension each of the safety belt of the associated vehicle and the tether within the cavity as the safety belt of the associated vehicle extends through the cavity along a first direction and the tether extends through the cavity along a second direction substantially orthogonal to the first direction.

In accordance with other particular examples of the present disclosure, another exemplary child car seat comprises: a base defining a cavity configured to receive the safety belt of the associated vehicle and the tether therein; a seat shell supported on the receiving portion of the base; and a tensioner mechanism pivotally attached to the base, the tensioner mechanism rotatable relative to the backing portion of the base between (a) a first position in which the tensioner mechanism is pivoted away from the base such that a distal end of the tensioner mechanism is spaced apart from the base and the tensioner mechanism does not engage or tension either of the safety belt of the associated vehicle and the tether, and (b) a second position in which the distal end of the tensioner mechanism is contiguous with the base and the tensioner mechanism engages and tensions each of the safety belt of the associated vehicle and the tether within the cavity.

In accordance with examples of this disclosure, the base may include a receiving portion that supports the seat shell and a backing portion that extends upward from the receiving portion. The tensioner mechanism may include a panel that is pivotally attached to a backing portion of the base and, when the tensioner mechanism is in the second position, is contiguous with the backing portion of the base. The panel may be generally accessible and capable of being selectively moved between the first and second positions when the seat shell is in the rearward-facing position. Conversely, the panel may be generally inaccessible and incapable of being selectively moved between the first and second positions when the seat shell is in the forward-facing position In accordance with yet other particular examples of the present disclosure, another exemplary child car seat comprises: a base; a seat shell, and a recline frame operatively attaching the seat shell to the base, the recline frame configured to permit the seat shell to recline with respect to the base, the recline frame including a pair of upper linear tracks, each of the upper linear tracks configured to receive an upper recline structure (such as an upper rod) of the seat shell therein. The upper recline structure may be adapted for linear translation along each of the upper linear tracks as the seat shell is reclined with respect to the base. The recline frame may further include a pair of lower linear tracks. Each of the lower linear track may define a plurality of openings configured to selectively receive a lower recline structure (such as a lower rod) of the seat shell therein for selectively positioning the seat shell in a discrete recline position.

In some examples, the recline frame operatively attaches the seat shell to the base such that each of the seat shell and the recline frame are rotatably supported on the base and selectively positionable on the base in at least a rearward-facing position and a forward-facing position.

In some examples, the child car seat with a recline frame as described above may be installed with a safety belt and a top tether, there the top tether is operatively attached to the base.

Other aspects of the invention may be apparent to those of ordinary skill with review of the attached drawings, appended claims, and additional description.

BRIEF DESCRIPTION OF THE DRAWINGS

The foregoing and other features of the present disclosure will become more fully apparent from the following description and appended claims, taken in conjunction with the accompanying drawings. Understanding that these drawings depict several examples in accordance with the disclosure and are, therefore, not to be considered limiting of its scope, the disclosure is described with additional specificity and detail below through the use of the accompanying drawings.

DETAILED DESCRIPTION

Figure 1A:
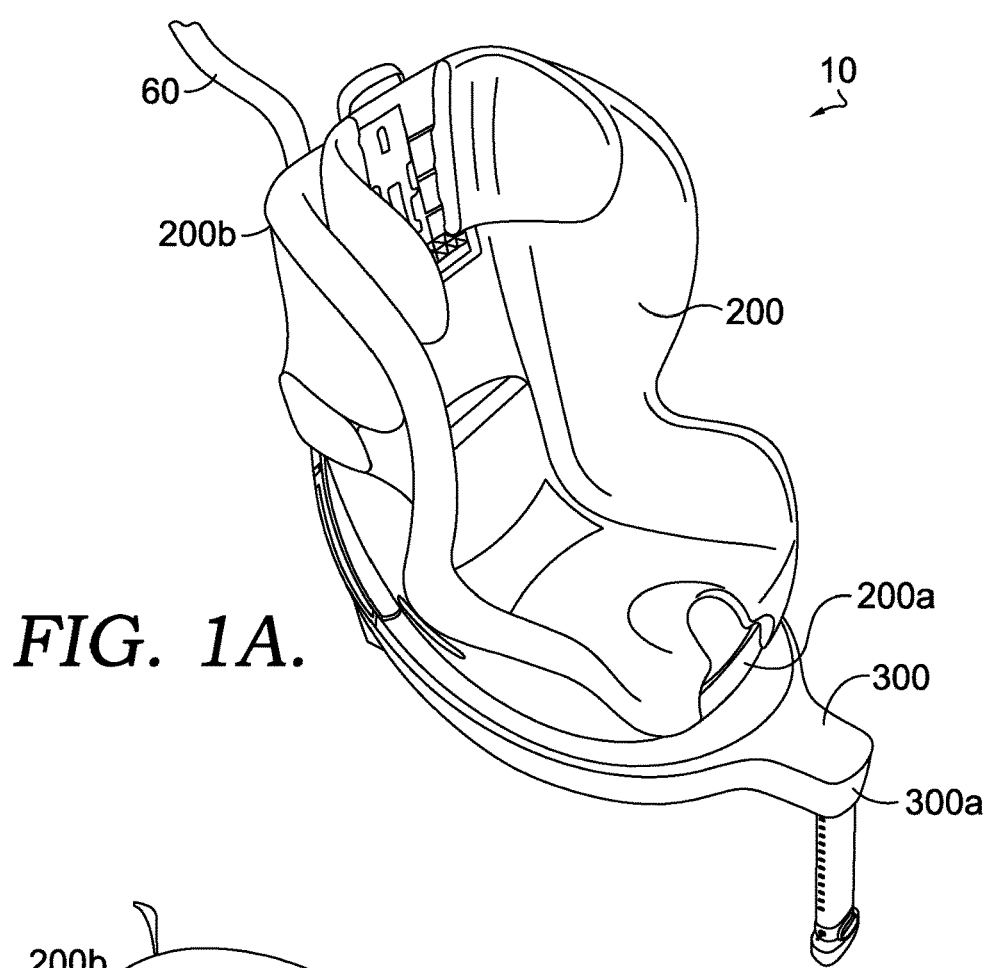
FIG. 1A is a front perspective view of a child car seat in a forward-facing position in accordance with the disclosure.

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and illustrated in the drawings, may be arranged, substituted, combined, and designed in a wide variety of different configurations, each of which are explicitly contemplated and form a part of this disclosure.

It should be noted that some of the terms used herein may be relative terms. For example, the terms "upper" and "lower" are relative to each other in location, i.e. an upper component is located at a higher elevation than a lower component in a given orientation, but these terms may change if the device is flipped. An intermediate component, on the other hand, is always located between an upper component and a lower component regardless of orientation. The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" or "upwardly" and "downwards" or "downwardly" are also relative to an absolute reference; upwards is always against the gravity of the earth. The term "parallel" should be construed in its lay sense of two surfaces that maintain a generally constant distance between them, and not in the strict mathematical sense that such surfaces will never intersect when extended to infinity. The terms "operative to" and "adapted to" and similar terms are used herein to describe that a particular component has certain structural features designed to perform a designated function. Such components should be construed as having the expressed structure, with the designated function being considered part of the structure.

Figure 1B:
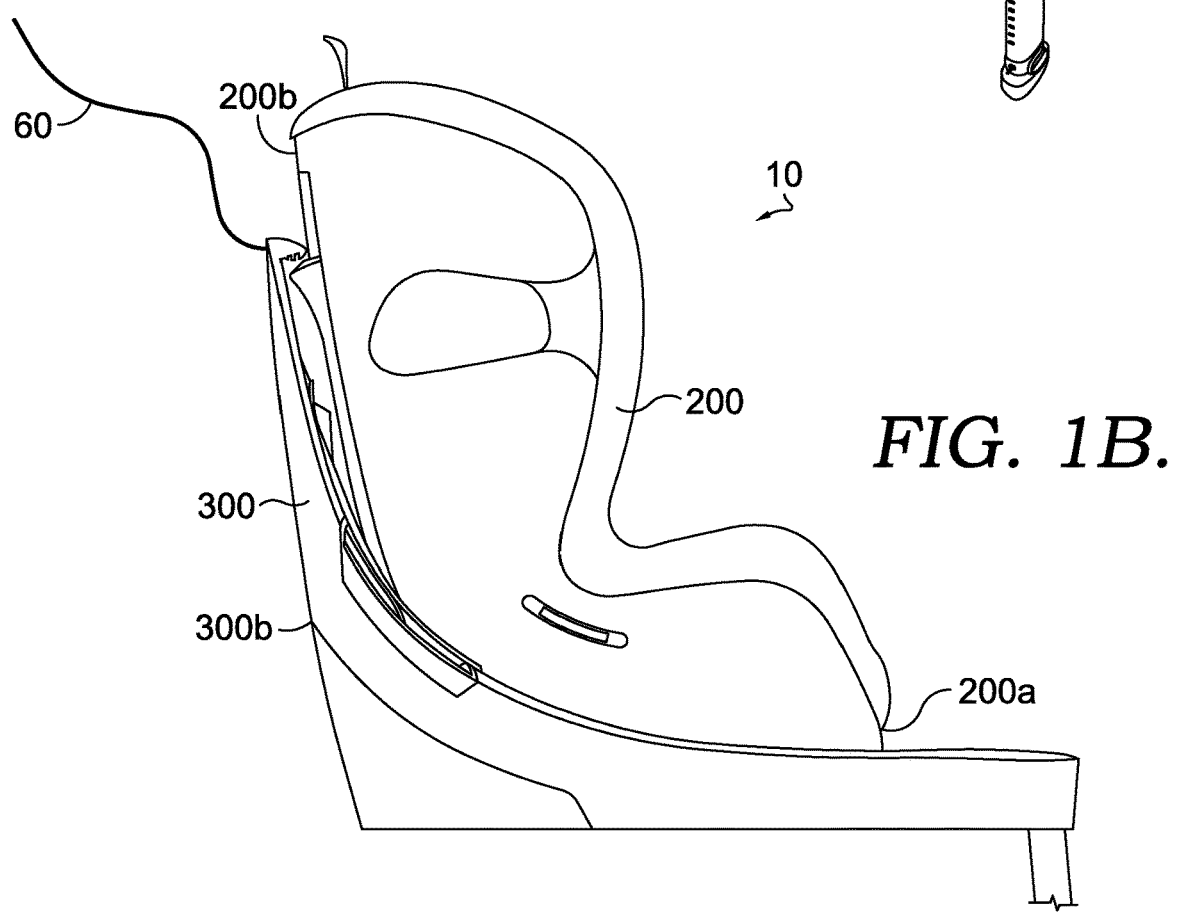
FIG. 1B is a side view of the child car seat of FIG. 1A in the forward-facing position.

In accordance with aspects of the disclosure, examples of child car seats are illustrated in various levels of specificity in FIGS. 1A-6B, and other details and features, as will be described herein, are illustrated in various levels of specificity in FIGS. 7A-15B. As will be appreciated by those skilled in the art, the car seats described herein may be convertible car seats that are convertible between a forward-facing configuration, a rearward-facing configuration, and, in some embodiments, a booster configuration. However, it will be appreciated that this disclosure may also relate to non-convertible car seats. The car seats of the present disclosure may be configured to support an infant, child, toddler, or the like. Very generally, a car seat 10 is designed for safely transporting an occupant in a car. As illustrated in FIG. 1, the car seat 10 generally includes a seat shell 200, which is supported on a base 300. As will be readily understood by those skilled in the art, the car seat 10 (and, namely, the base 300) may be installed by being affixed to the seat of a car, such as by a seat belt of the car and/or a top tether.

As described in more detail herein, the seat shell 200 may be secured to the base in a manner such that the seat shell 200 is not readily removable without additional tools, but it should be understood that, in some embodiments, the seat shell 200 is removably attached to the base 300. Additionally, the seat shell 200 may be rotatable with respect to the base 300. The seat shell 200 may be rotated to be selectively positionable in a variety of different positions (e.g., a rearward-facing position, a forward-facing position, an intermediate loading position).

FIGS. 1A-1B and FIGS. 3A-3B depict the seat shell 200 supported on the base 300 in a forward-facing position. In the forward-facing position, a forward end 200a of the seat shell 200 and a forward end 300a of the base 300 face a common direction (e.g., toward the forward end of the vehicle when installed), and a rear end 200b of the seat shell 200 and a rear end 300b of the base 300 face a common direction (e.g., toward the rear end of the vehicle when installed).

FIGS. 2A-2B and FIGS. 4A-6B depict the seat shell 200 supported on the base 300 in a rearward-facing position. As can be readily understood with reference back to FIGS. 1A-1B and FIGS. 3A-3B, the seat shell 200 is rotated with respect to the base 300 about 180° between the forward-facing position (FIGS. 1A-1B and FIGS. 3A-3B) and the rearward-facing position (FIGS. 2A-2B and FIGS. 4A-6B). Put another way, the seat shell 200 generally faces one direction in the forward-facing position and faces an opposite direction in the rearward-facing position. With reference to FIGS. 2A-2B and FIGS. 4A-6B, in the rearward-facing position, the rear end 200b of the seat shell 200 and the forward end 300a of the base 300 face a common direction (e.g., toward the forward end of the vehicle when installed), and the forward end 200a of the seat shell 200 and the rear end 300b of the base 300 face a common direction (e.g., toward the rear end of the vehicle when installed).

As may now be appreciated, the seat shell 200 may generally be rotated with respect to the base 300 between the forward-facing position and the rearward-facing position as the base 300 remains installed and stationary in the vehicle. Further yet, the seat shell 200 may generally be rotated any desired amount with respect to the base 300 (including being rotated a full 360°) and in different directions. As may further be appreciated, the seat shell 200 is rotatable with respect to the base 300 to a variety of intermediate positions (not shown) between the forward-facing position and the rearward-facing position. In this regard, it is specifically contemplated that the seat shell 200 may be rotatable with respect to the base 300 about 90° in both a clockwise direction and a counterclockwise direction to intermediate positions. Such intermediate positions may include where the forward end 200a of the seat shell 200 is positioned towards the passenger's side of the vehicle or the driver's side of the vehicle. In this way, the car seat 10 is adapted to be usable on either the driver's side or passenger's side of a vehicle and equally provides ease for a user to place a child into the car seat from a side door of the vehicle with the seat shell 200 generally facing the user. The base 300 may, in certain constructions, be configured to lock rotation of the seat shell 200 with respect to the base 300 in each of the forward-facing position and the rearward-facing position.

FIGS. 2A-7B, 8, and 9B illustrate additional features of the base 300. Very generally, the base 300 may support and stabilize the seat shell 200. The base 300 may include a receiving portion 310 and a backing portion 350. The receiving portion 310 of the base 300 may generally operate to support the seat shell 200. For example, at least a portion of the seat shell 200 may be received by and/or within the receiving portion 310 of the base 300. Put another way, the receiving portion 310 of the base 300 may be configured to interface with at least a portion of the seat shell 200. The backing portion 350 may extend upwardly away from the receiving portion 310, such as extending upwardly from the receiving portion 310 at a location proximate the rear end of the base 300.

Figure 4A:
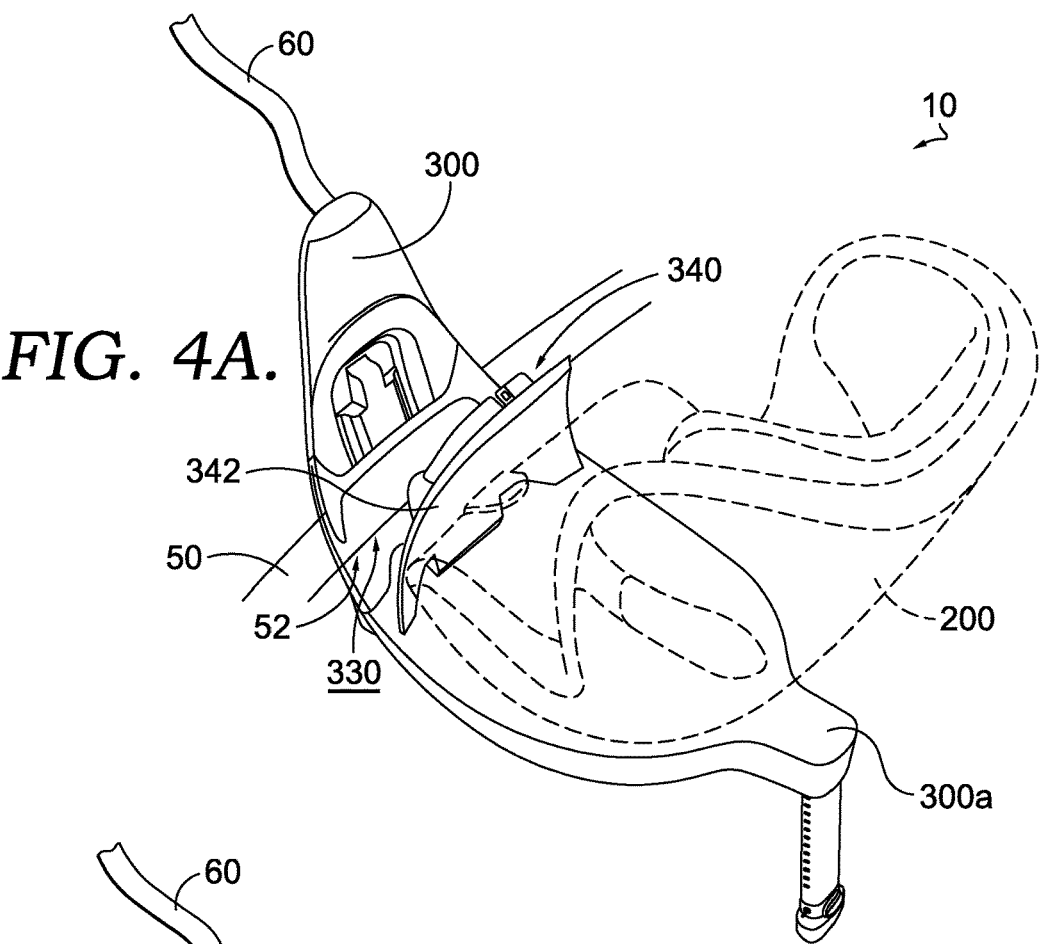
FIG. 4A is a front perspective view of the child car seat of FIG. 1A in the rearward-facing position, with the seat shell in phantom to aid in showing a tensioner mechanism in a first position relative to the base to receive a safety belt of an associated vehicle and a tether.
Figure 4B:
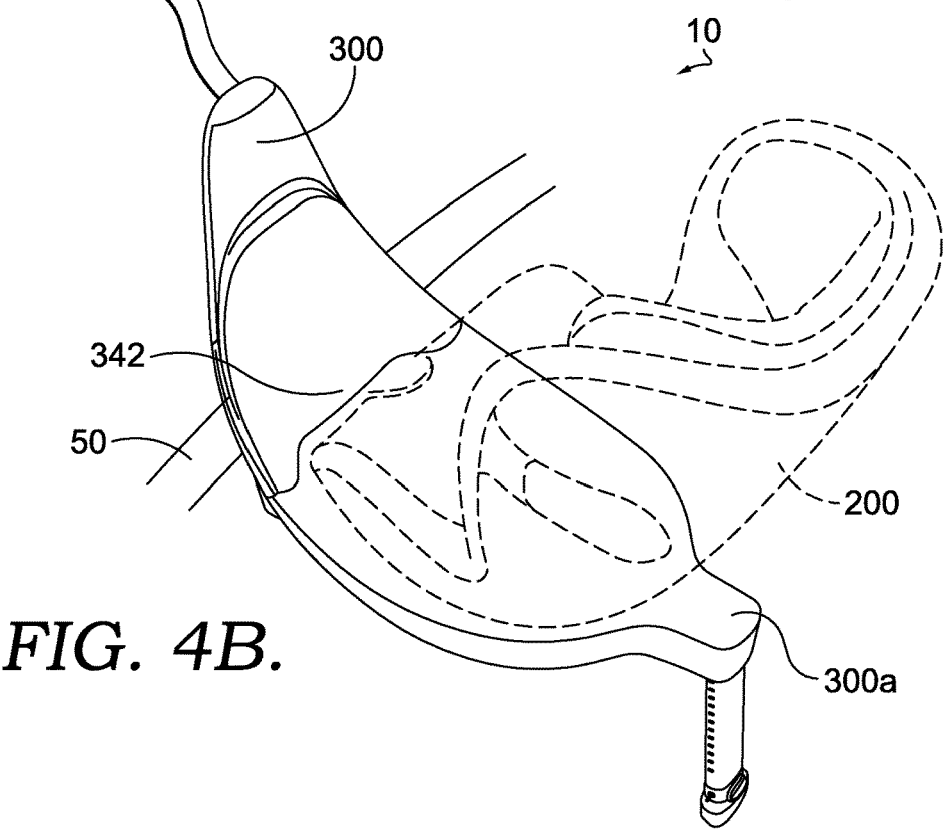
FIG. 4B is a front perspective view of the child car seat of FIG. 4A in the rearward-facing position, with the seat shell in phantom to aid in showing the tensioner mechanism in a second position relative to the base to engage and tension the safety belt of the associated vehicle and the tether.
Figure 5A:
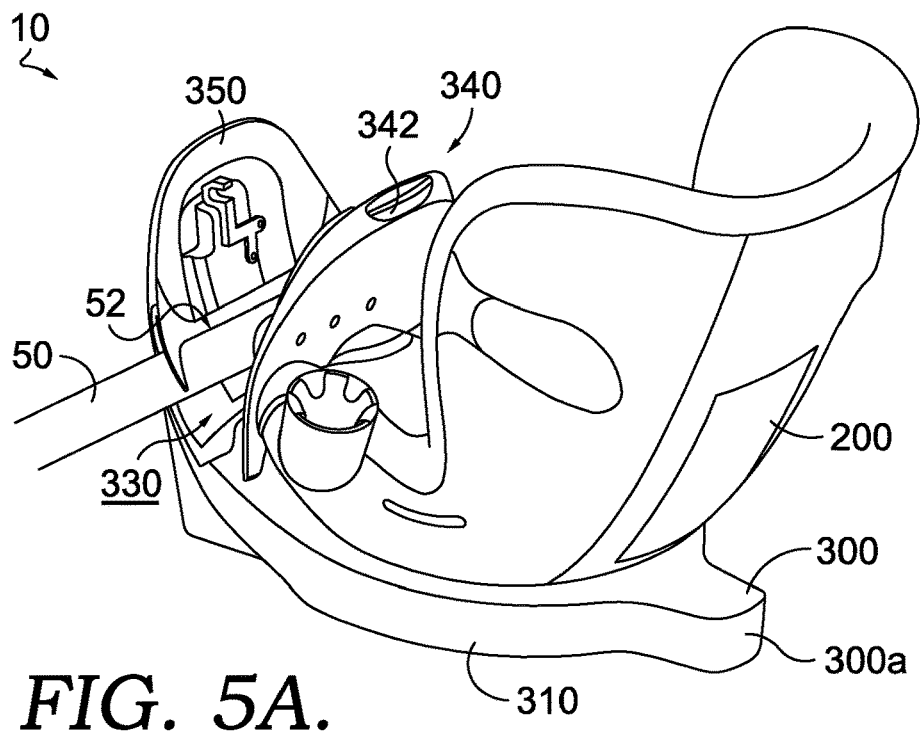
FIG. 5A is a front perspective view of a child car seat in a rearward-facing position in accordance with the disclosure, with a tensioner mechanism in a first position relative to the base to receive a safety belt of an associated vehicle.
Figure 5B:
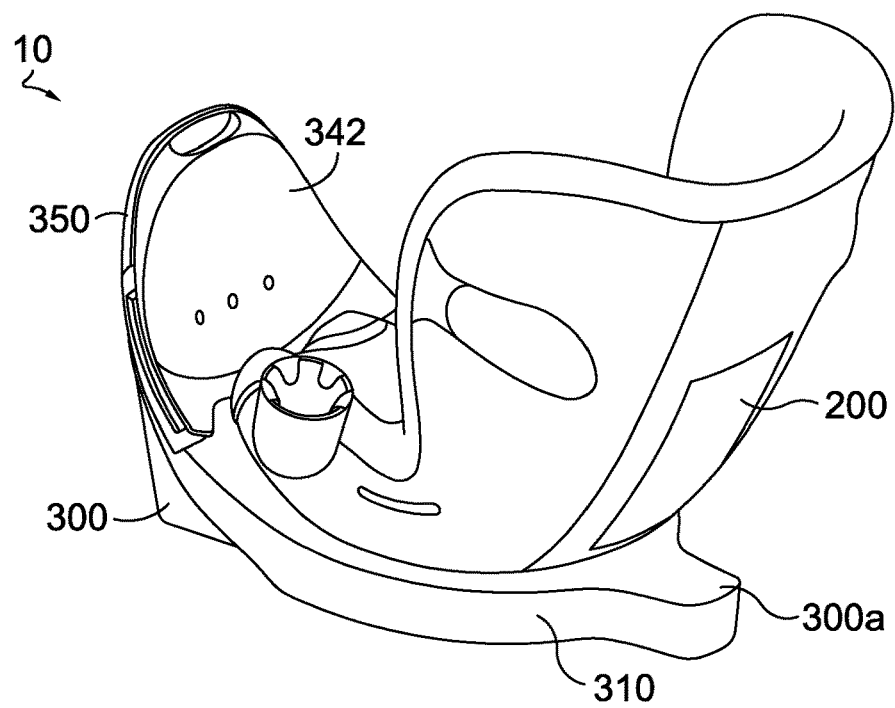
FIG. 5B is a front perspective view of the child car seat of FIG. 5A in the rearward-facing position, with the tensioner mechanism in a second position relative to the base to engage and tension the safety belt of the associated vehicle.
Figure 6A:
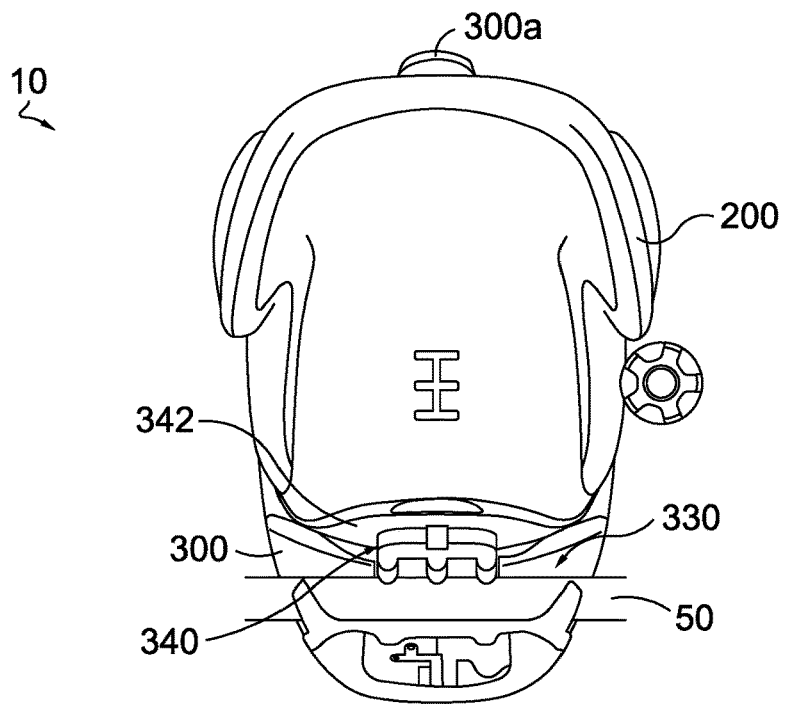
FIG. 6A is a top view of the child car seat of FIG. 6A in the rearward-facing position, with a tensioner mechanism in a first position relative to the base to receive a safety belt of an associated vehicle.
Figure 6B:
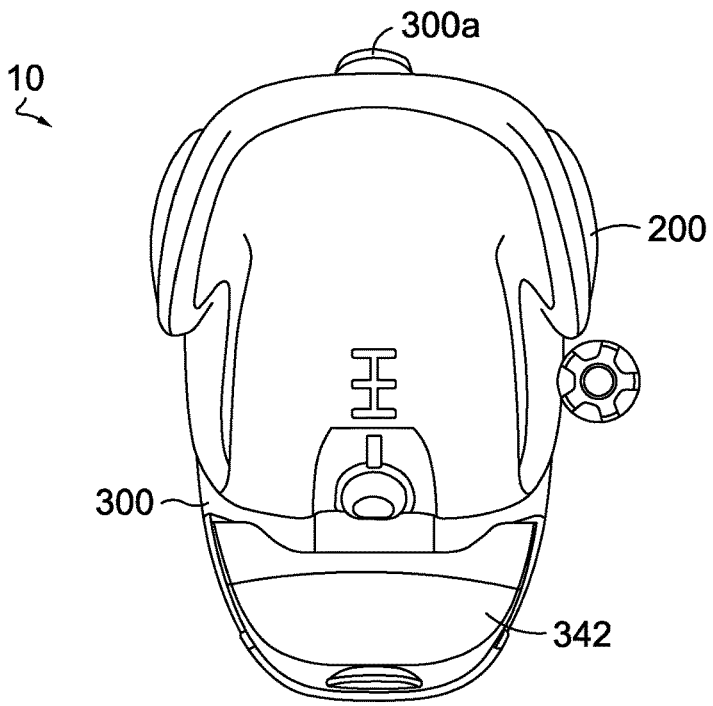
FIG. 6B is a top view of the child car seat of FIG. 6A in the rearward-facing position, with the tensioner mechanism in a second position relative to the base to engage and tension the safety belt of the associated vehicle.
Figure 7A:
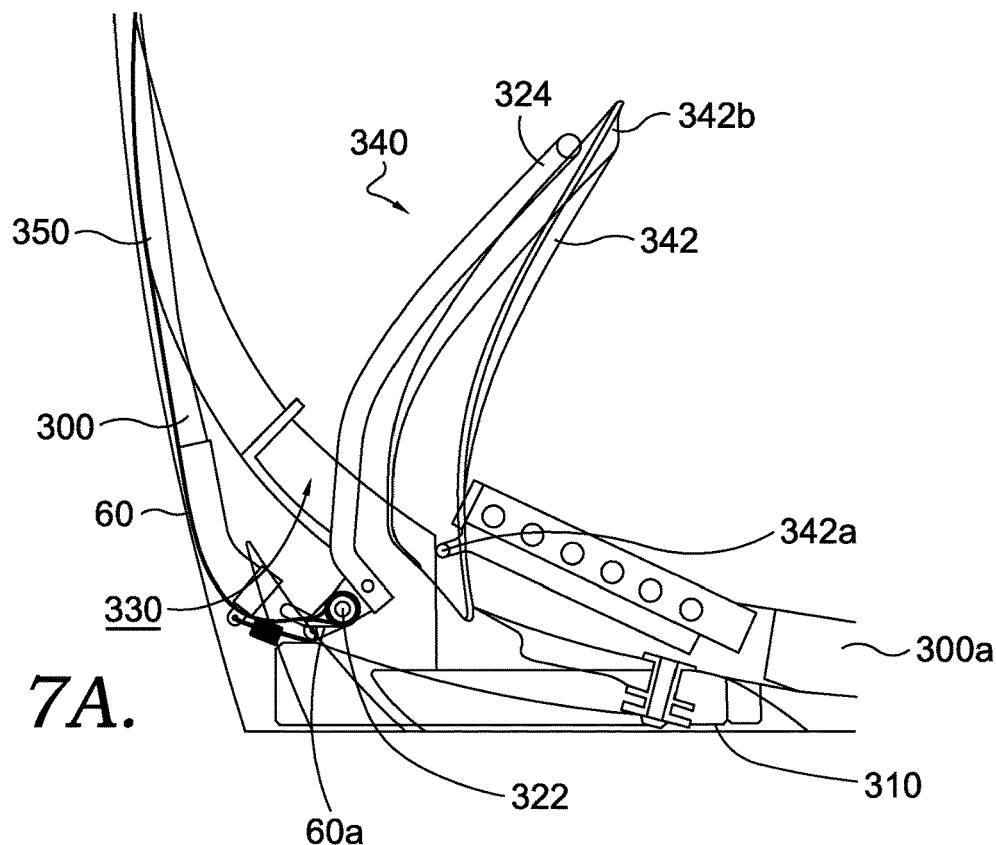
FIG. 7A is a side cross-sectional view of a base of a child car seat in accordance with the disclosure, with a tensioner mechanism in a first position relative to the base.
Figure 7B:
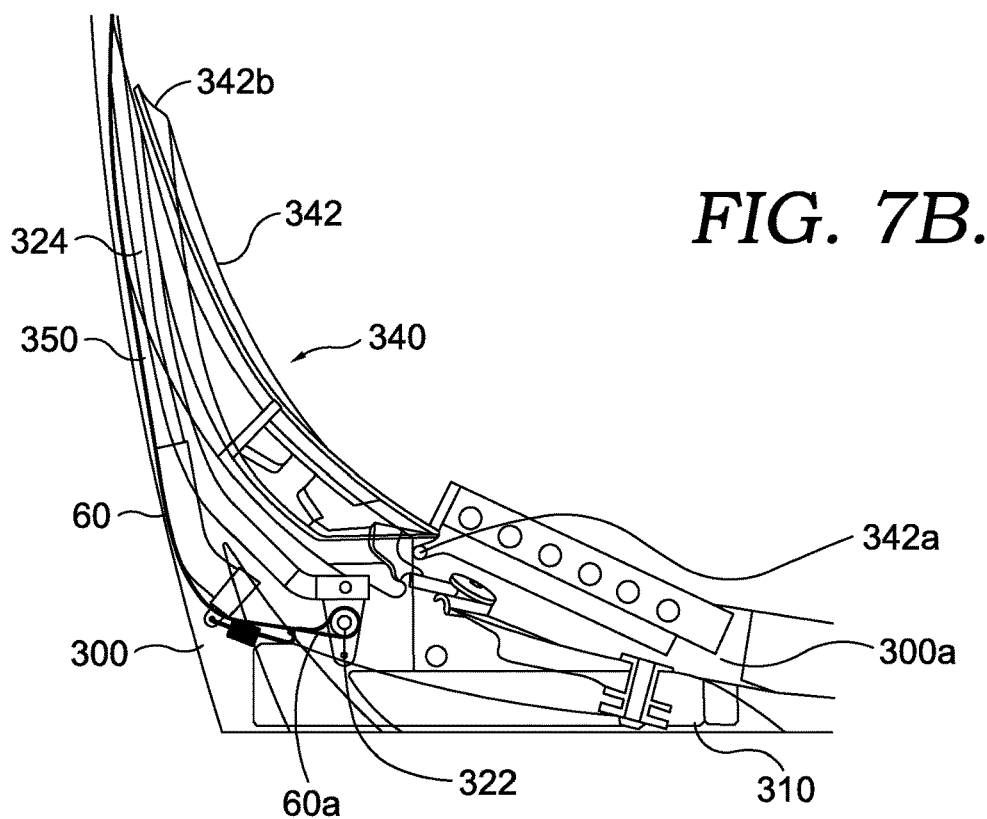
FIG. 7B is a side cross-sectional view of the base of FIG. 7A, with the tensioner mechanism in a second position relative to the base.

The base 300 may define a cavity 330. The cavity 330 of the base 300 may be configured to at least partially receive the safety belt 50 and/or a tether 60 (which may be a top tether) therein, such as is illustrated in FIGS. 4A, 5A, and 6A. The safety belt 50 may be received across the base 300, such that a belt path 52 is defined as extending from one side (e.g., towards the driver's side of the vehicle when the car seat 10 is installed) to an opposite side (e.g., towards the passenger's side of the vehicle when the car seat 10 is installed) of the base 300. The safety belt 50 may generally be an existing safety belt of the vehicle (e.g., a lap belt). With specific comparison between FIG. 1A (depicting the seat shell 200 supported on the base 300 in the forward-facing position) and FIG. 4A (depicting the seat shell 200 supported on the base 300 in the rearward-facing position), it can be seen that the safety belt 50 is positioned within the cavity 330 such that safety belt 50 is positioned above and rearward of a lower portion of the seat shell 200 when the seat shell 200 is in a forward-facing position and remains in this relatively above and rearward position in the cavity 330 when the seat shell 200 moved with respect to the base 300. This advantageously allows the seat shell 200 to be rotated and/or reclined with respect to the base 300 without interfering with the safety belt 50 and without any need to uninstall the base 300 or otherwise reroute or reposition the safety belt 50 when it is desired to rotate or recline the seat shell 200 with respect to the base 300. In addition, the seat shell 200 is readily rotatable and/or reclined with respect to the base 300 without any need to uninstall or reinstall the base 300 or otherwise reroute or reposition the tether 60. In some examples, the seat shell 200 may be readily removable or detachable from the base 300 without any need to uninstall or reinstall the base 300 or otherwise reroute or reposition the safety belt 50 or the tether 60, although other examples of the disclosure are not so limited.

Figure 2A:
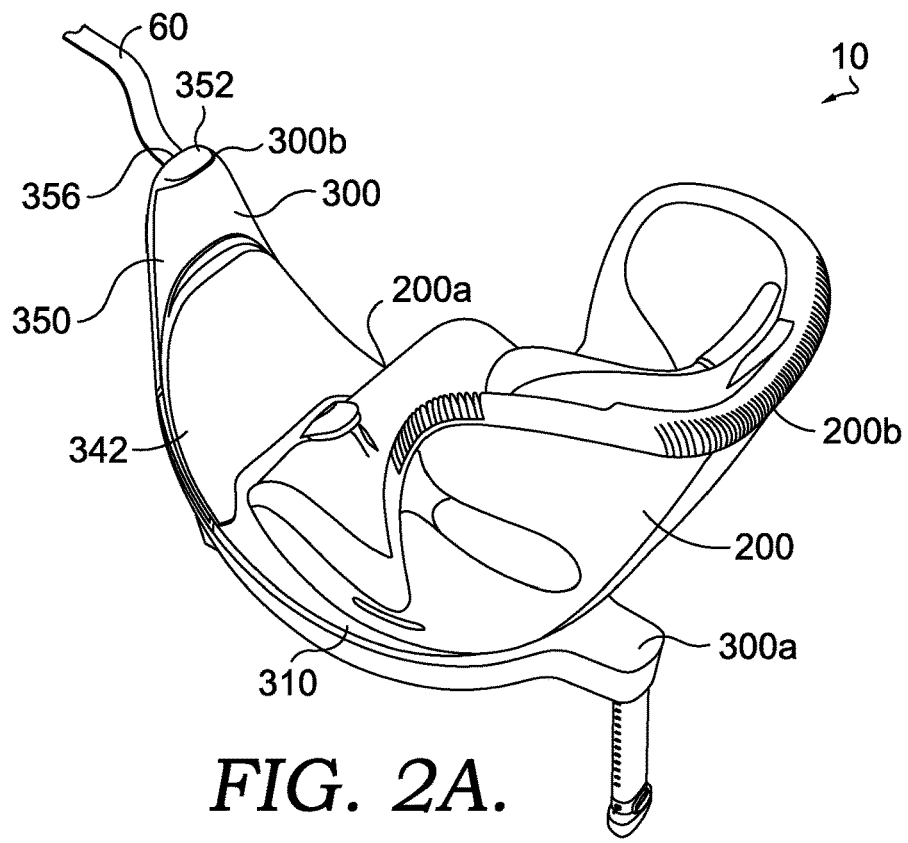
FIG. 2A is a front perspective view of the child car seat of FIG. 1A in a rearward-facing position.
Figure 2B:
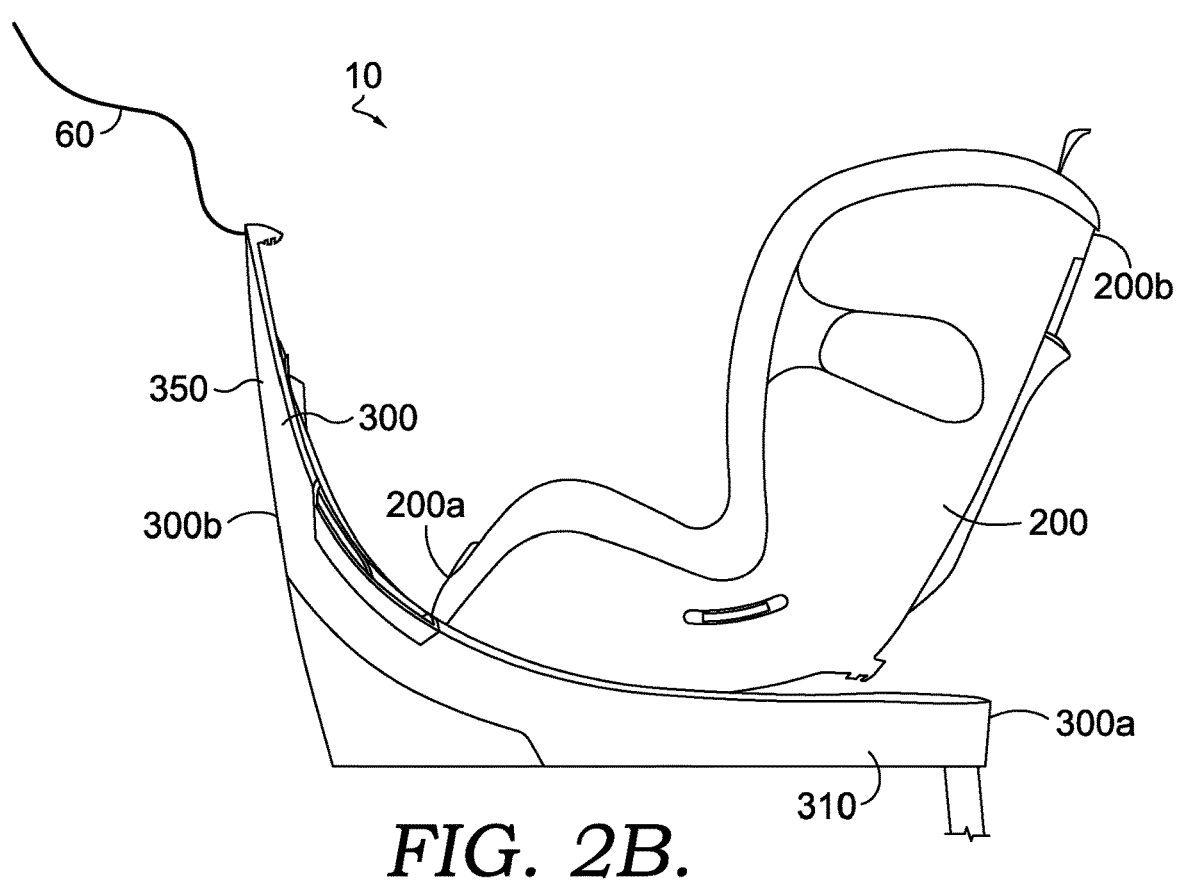
FIG. 2B is a side view of the child car seat of FIG. 2A in the rearward-facing position.
Figure 3A:
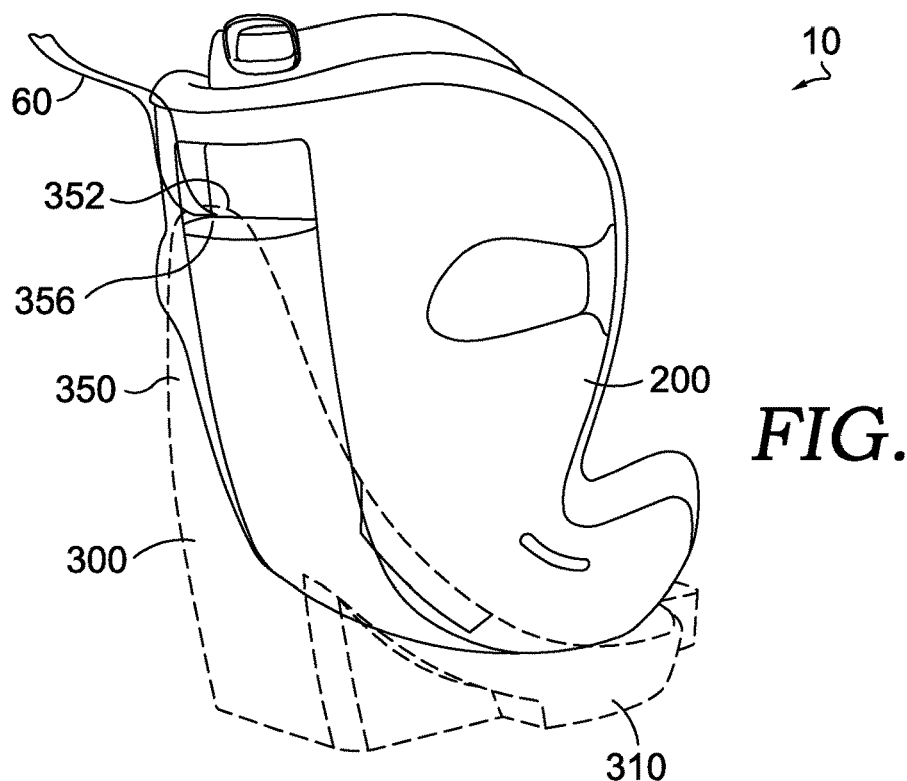
FIG. 3A is a rear perspective view of the child car seat of FIG. 1A in the forward-facing position, with the base in phantom.
Figure 3B:
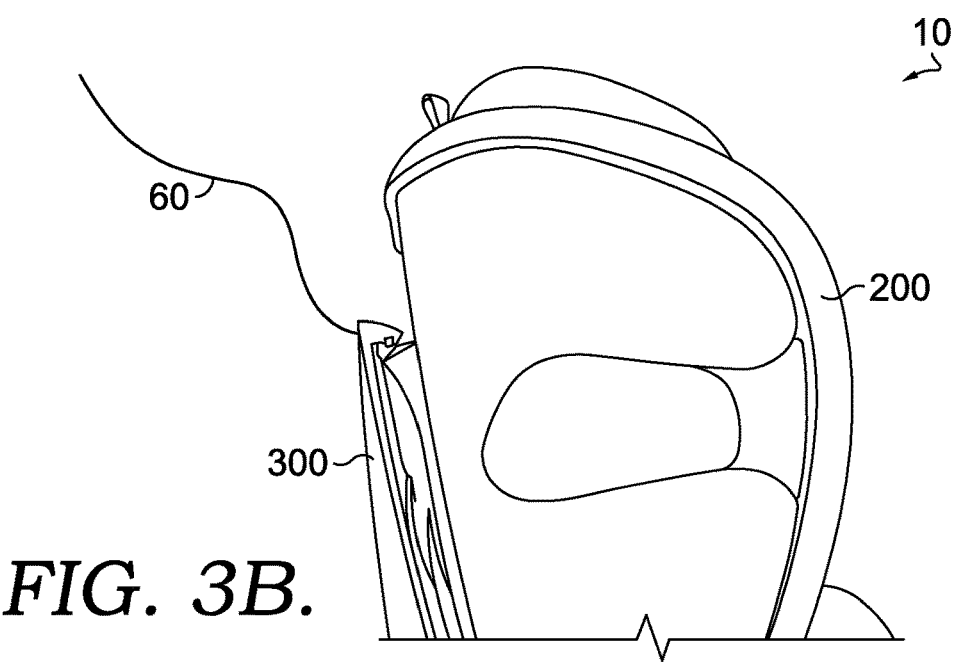
FIG. 3B is a side view of an upper portion of the child car seat of FIG. 3A in the forward-facing position.

With reference now to FIG. 2A and FIG. 3A, the backing portion 350 of the base 300 may include an aperture 356. The aperture 356 may generally be designed to operate as an opening for the receipt of the tether 60 therethrough. The aperture 356 may be defined proximate an upper end 352 of the backing portion 350 of the base 300. By extending the tether 60 within the base 300 from the aperture 356 defined at the upper end 352 of the backing portion 350, the base 300 may be configured to remain stationary as the seat shell 200 is rotated with respect to the base 300. This advantageously allows the seat shell 200 to be rotated and/or reclined with respect to the base 300 without interfering with the tether 60 and without any need to uninstall the base 300 or otherwise reroute or reposition the tether 60 when it is desired to recline and/or rotate the seat shell 200 with respect to the base 300. As such, the car seat 10 may advantageously remain constantly anchored via the tether 60 passing through the aperture 356 in the base 300 without interfering with rotation and/or recline of the seat shell 200 with respect to the base 300. In examples where the seat shell 200 may be readily removable or detachable from the base 300, the disclosed positioning of the tether 60 may aid in such removal without any need to uninstall or reinstall the base 300 or otherwise reroute or reposition the tether 60.

With continued reference to FIGS. 4A, 5A, 6A, 7A, and 8, the cavity 330 defined in the base 300 (e.g., at a lower end of the backing portion 350 of the base 300) can be more clearly seen. The cavity 330 defined in the base 300 is configured to receive at least a portion of each of the safety belt 50 and the tether 60. The tether 60 can be seen within the cavity 330 in FIGS. 7A and 8. The cavity 330 generally has an open or missing top face and is at least partially defined and bound by an inner surface of the receiving portion 310 of the base 300. The cavity 330 defined in the base 300 may generally be of any desired size and/or shape to suit a particular application. By way of non-limiting example, the cavity 330 defined in the base 300 may be sized and/or shaped to accommodate at least a portion of the safety belt 50 and the tether 60 for tensioning therein, as described herein.

With reference now to FIGS. 2A, 4A-7B, and 8, a tensioner mechanism 340 is shown. Very generally, the tensioner mechanism 340 is configured to engage and tension each of the safety belt 50 and the tether 60 within the cavity 330 of the base 300. In some embodiments, a single movement of the tensioner mechanism 340 (such as through pivoting the tensioner mechanism 340 as described below) engages and tensions both the safety belt 50 and the tether 60. In some embodiments, the tensioner mechanism 340 tensions the safety belt 50 and tether 60 simultaneously.

More specifically, the tensioner mechanism 340 is movable relative to the base 300 between first and second positions. In the first position (refer to FIGS. 4A, 5A, 6A, 7A, and 8), also referred to in some cases as an open position, the tensioner mechanism 340 does not engage or tension either of the safety belt 50 and the tether 60 within the cavity 330 of the base 300. In the second position (refer to FIGS. 4B, 5B, 6B, and 7B), also referred to in some cases as a closed position, the tensioner mechanism 340 engages and tensions each of the safety belt 50 and the tether 60 within the base 300. The tensioner mechanism 340 may be selectively moved between the first and second positions relative to the base 300 by rotating the tensioner mechanism 340 relative to the base 300 between the first and second positions. In such examples, the tensioner mechanism 340 may be pivotally attached to the base 300.

As may be appreciated, the tensioner mechanism 340 is generally accessible when the seat shell 200 is in the rearward-facing position (refer to FIGS. 2A-2B, 4A-7B, and 8). Conversely, the tensioner mechanism 340 is generally inaccessible when the seat shell 200 is in the forward-facing position (refer to FIGS. 1A-1B and 3A-3B). As such, in some embodiments, the tensioner mechanism 340 is generally capable of being selectively moved between the first and second positions when the seat shell 200 is in the rearward-facing position, but the tensioner mechanism 340 is generally incapable of being selectively moved between the first and second positions when the seat shell 200 is in the forward-facing position. Those skilled in the art will readily understand that the tensioner mechanism 340 is generally inaccessible and incapable of being selectively moved between the first and second positions when the seat shell 200 is in the forward-facing position because the seat shell 200 at least partially covers the tensioner mechanism 340 in the forward-facing position, and those skilled in the art will readily understand that the tensioner mechanism 340 is generally accessible and capable of being selectively moved between the first and second positions when the seat shell 200 is in the rearward-facing position because the seat shell 200 has been rotated relative to the base 300 such that the seat shell 200 no longer covers the tensioner mechanism 340.

As previously described, the safety belt 50 generally extends across and within the cavity 330 defined in the base 300 along the belt path 52 defined thereacross. Conversely, the top tether 60 generally extends through the aperture 356 defined at the upper end 352 of the backing portion 350 of the base 300 and into the cavity 330 defined in the base 300. As such, as may be understood with reference to FIGS. 4A, 5A, 6A, and 7A, when the tensioner mechanism 340 is in the second or closed position, the tensioner mechanism 340 engages and tensions each of the safety belt 50 and the tether 60 within the cavity 330 defined in the base 300 as the safety belt 50 extends through the cavity 330 along a first direction and the tether 60 extends through the cavity 330 along a second direction substantially orthogonal to the first direction. By way of non-limiting example, the safety belt 50 may extend through the cavity 330 along a crosswise direction (e.g., across the base 300), and the tether 60 may extend through the cavity 330 orthogonal to the crosswise direction.

As previously described and shown in the illustrated examples in FIGS. 2A-8, the tensioner mechanism 340 is movable between the first (open) position and the second (closed) position by rotating the tensioner mechanism 340 relative to the base 300. As such, the tensioner mechanism 340 may be pivotally attached to the base 300 (e.g., along a forward side of the belt path 52 defined by the base 300). By way of example, the tensioner mechanism 340 may be pivoted away from the backing portion 350 of the base 300 and towards the forward end 300a to be moved into the first position. A distal of the tensioner mechanism 340 end (such as a distal end 342b of a panel 342 as described below) that is spaced apart from where the tensioner mechanism 340 is pivotally attached to the base 300 may also be spaced apart from the backing portion 350 of the base 300 when in the first position.

Conversely, the tensioner mechanism 340 may be pivoted toward the backing portion 350 of the base 300 to be moved into the second position. When in the second position, the tensioner mechanism 340 may apply pressure on the safety belt 50 with the cavity 330 such that the safety belt 50 may, in some instances, be moved at least slightly downward and/or rearward in the cavity 330. Additionally, pivoting the tensioner mechanism 340 into the second position applies tension to the tether 60 within the cavity 330. In the example illustrated examples in FIGS. 2A-8 and as further described below with respect to FIG. 8, the tether 60 is attached (or anchored) to a portion of the tensioner mechanism 340 such that, when the tensioner mechanism 340 is pivoted into the second position, the portion of the tether 60 attached to the tensioner mechanism 340 is moved in a direction other than towards the aperture 356, which increases tension in the tether 60.

In the particular example in FIGS. 2A-8, the tensioner mechanism 340 comprises a bar 320 and a panel 342. The bar 320 includes an anchor portion 322 to which the tether 60 is secured. The anchor portion 322 may be oriented generally horizontally or crosswise within the cavity 330 and may be positioned lower than the belt path 52 so that the anchor portion 322 is below the safety belt 50 when the safety belt 50 is positioned within the cavity 330. The bar 320 may further include a lever portion 324 that is attached to the anchor portion 322 and may generally be used as a lever or handle to move the anchor portion 322. In the example illustrated in FIGS. 2A-8, the lever portion 324 of the bar 320 is formed with a U-shaped structure extending upward from the anchor portion 322, but it is contemplated that the lever portion 324 may have other forms, such as a single arm or multiple arms extending upward from the anchor portion 322.

The bar 320 may be secured to the panel 342. Specifically, the lever portion 324 of the bar 320 may be secured to the panel 342. In this way, the panel 342 may be used as a handle or mechanism through which a user can selectively move the tensioner mechanism 340. For example, a proximal end 342a of the panel 342 may be pivotally attached to the base 300, and the panel 342 may be pivoted away from the backing portion 350 of the base 300 into the first position and pivoted toward the backing portion 350 of the base 300 into the second position. Moving the panel 342 between the first and second positions may cause the lever portion 324 and, therefore, the anchor portion 322 attached to the lever portion 324 to move.

In the first position, the distal end 342b of the panel 342 may be spaced apart from the backing portion 350 of the base 300, and, in the second position, the distal end 342b of the panel 342 may be contiguous with the backing portion 350 of the base 300. In certain examples, in the second position, the panel 342 may be positioned substantially flush with the backing portion 350 of the base 300 so as to collectively provide a substantially smooth backing surface, although other examples of the disclosure are not so limited. Additionally, when in the second position, the panel 342 may completely cover the bar 320. In other embodiments, the tensioner mechanism 340 may not include the panel 342, such that the bar 320 may be moved directly by a user (e.g., by a user grasping the lever portion 324 to move the tensioner mechanism 340 between the first and second positions).

The panel 342 may also function as a cover for the cavity 330 of the base. For example, the panel 342 may at least partially cover the cavity 330 when the tensioner mechanism 340 (and therefore, the panel 342) is in the second or closed position (refer to FIGS. 4B, 5B, 6B, and 7B). In certain examples, the panel 342 may completely cover the cavity 330 of the base 300 (e.g., along an open or missing face of the cavity 330) when the panel 342 is in the second or closed position. When in the second or closed position, the panel 342 may define at least a portion of the backing portion 350 of the base 300.

Figure 8:
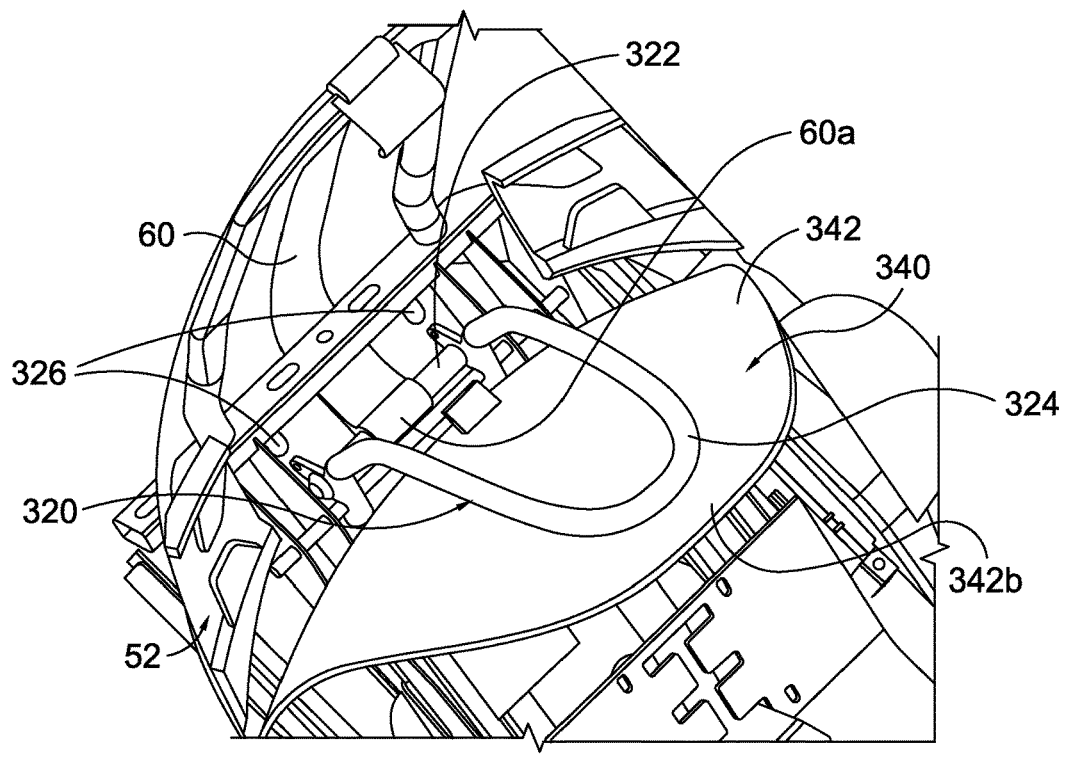
FIG. 8 is a top perspective view of rear portion of a base of a child car seat in accordance with the disclosure, with a tensioner mechanism in a first position relative to the base.

With specific reference to FIG. 8, details of the bar 320 may be seen. As illustrated, a portion of the tether 60 may be attached to the anchor portion 322 of the bar 320 within the cavity 330. The tether 60 may be attached to the bar 320 within the base 300 by any desired means to suit a particular application. By way of non-limiting example, a proximal end 60a of the tether 60 may be attached to the bar 320 within the base 300 and, more specifically, the proximal end 60a of the tether may be wrapped around the bar 320. As the tensioner mechanism 340 is selectively moved between the first and second positions relative to the base 300 (either through pivoting the panel 342 or directly pivoting the lever portion 324 of the bar 320), the anchor portion 322 of the bar 320 and, therefore, the portion of the tether 60 attached to the anchor portion 322 may be moved. More specifically, the bar 320 may be operatively connected to the tensioner mechanism 340 such that (a) the anchor portion 322 of the bar 320 and the attached tether 60 are displaced toward the forward end 300a of the base 300 as the tensioner mechanism 340 (the lever portion 324 and, in some aspects, the panel 342) is moved from the first position to the second position, and (b) the anchor portion 322 of the bar 320 and the attached tether 60 are displaced away from the forward end 300a of the base 300 as the tensioner mechanism 340 is moved from the second position to the first position. This movement may be seen with reference to FIGS. 7A and 7B. Displacement of the anchor portion 322 and the tether 60 toward the forward end 300a of the base 300 may increase the tension on the tether 60, while displacement of the anchor portion 322 and the tether 60 away from the forward end 300a of the base 300 may decrease the tension on the tether 60. In other examples, tension on the tether 60 may be adjusted by displacement of the anchor portion 322 in other directions, such as downward.

The bar 320 may also be operatively connected to the base 300. In the illustrated example, the bar 320 may be operatively connected to the base 300 by a pair of extension springs 326. Each of the extension springs 326 may be configured to (a) bias the bar 320 away from the forward end 300a of the base 300, and (b) expand as the tensioner mechanism 340 is moved from the first position to the second position (e.g., overcoming the spring bias). In this way, the extension springs 326 may bias the tensioner mechanism 340 (including the panel 342 attached to the bar 320) into the first (opened) position, which prevents the panel 342 and the bar 320 from inadvertently closing while a user is installing the safety belt 50 within the base 300. In other examples, other biasing devices, such as a pair of torsion springs, a pair of compression springs, or other suitable devices, could be employed.

Figure 9:
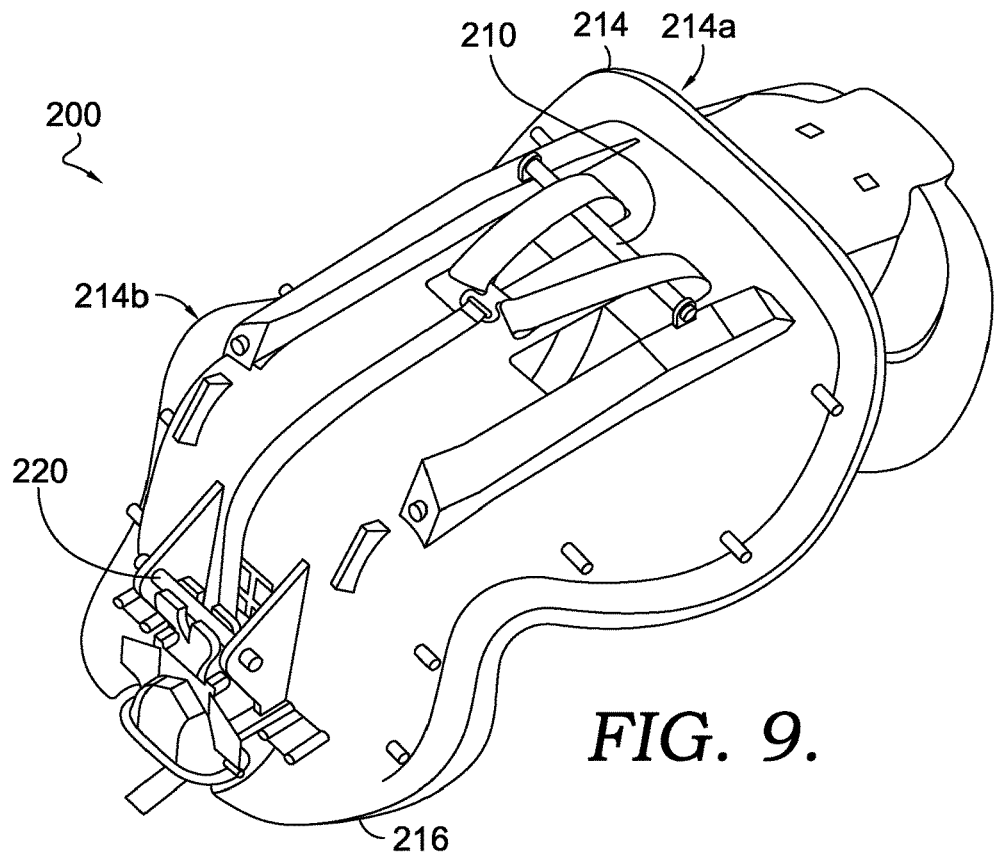
FIG. 9 is a rear perspective view of a seat shell in accordance with the disclosure.

Turning now to FIG. 9, additional features of the seat shell 200 are shown. Very generally, the seat shell 200 may support and stabilize an occupant (e.g., an infant or child) therein and/or thereon. As described, the seat shell 200 may be supported on the base 300, and the seat shell 200 may be reclinable with respect to the base 300 such that the seat shell 200 is selectively positionable in a variety of different angles with respect to the base 300 (e.g., upright angle (or position), a fully reclined angle or position, and intermediate angles or positions). In this example, the seat shell 200 includes one or more recline structures that engage with linear tracks interfacing between the seat shell 200 and the base 300 as described below. Specifically, the seat shell 200 may include one or more upper recline structures that engage with upper linear tracks and one or more lower recline structures that engage with upper linear tracks.

In examples, the recline structures on the seat shell 200 may include an upper rod 210 and a lower rod 220. The upper and lower rods 210, 220 may be positioned in or on a rear surface of the seat shell 200 and may be configured to assist in positioning the seat shell 200 in discrete reclined or upright positions with respect to the base 300, as described herein. In some examples, the upper rod 210 is positioned on a back portion 214 of the seat shell 200, and the lower rod 220 is positioned on a seat position 216 of the seat shell 200. Further, in some examples, the upper rod 210 may be positioned so that it is closer to a top end 214a of the back portion 214 than the bottom end 214b of the back portion 214.

Figure 10A:
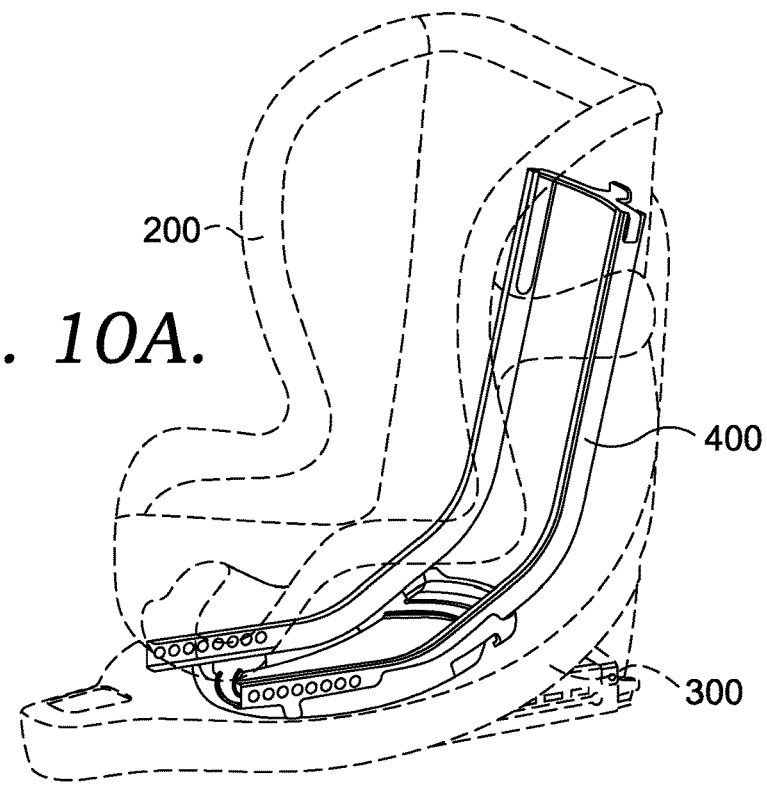
FIG. 10A is a front perspective view of a child car seat in accordance with the disclosure, with the seat shell and the base shown in phantom to aid in showing a recline frame operatively attaching the seat shell to the base.
Figure 10B:
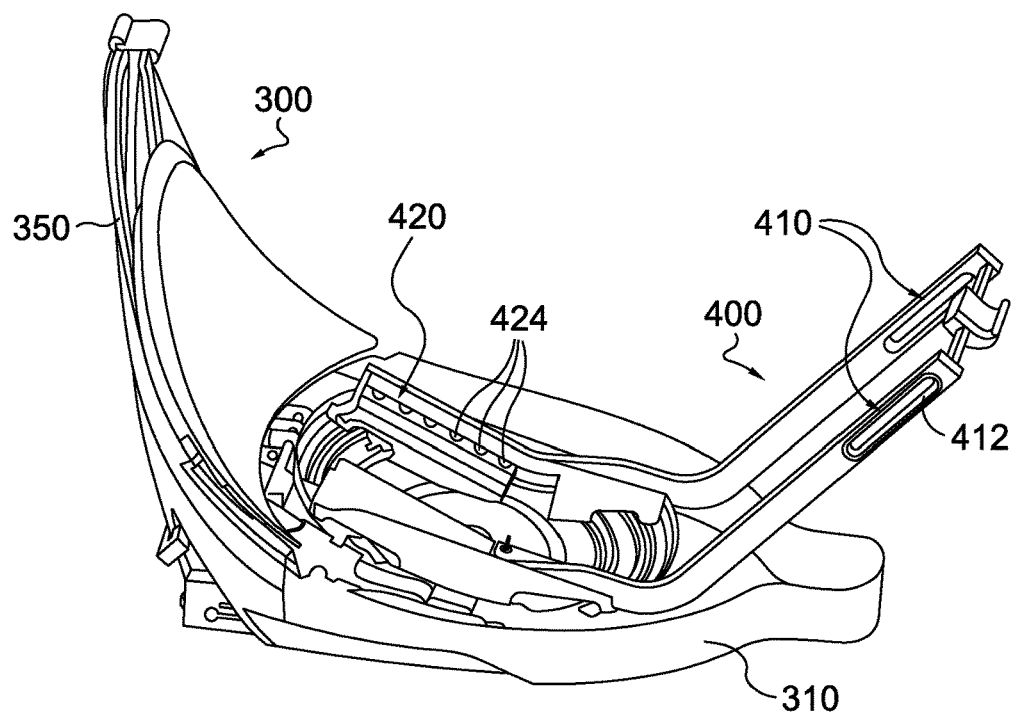
FIG. 10B is a side perspective view of a base and a recline frame operatively attached thereto in accordance with the disclosure.

As shown in FIG. 10A, the seat shell 200 may be operatively attached to the base 300 by a recline frame 400. As described, the seat sell 200 may be rotatable with respect to the base 300, and particularly, the recline frame 400 may operatively attach the seat shell 200 to the base 300 such that each of the seat shell 200 and the recline frame 400 are rotatably supported on the base 300 and selectively positionable on the base 300 in at least a rearward-facing position and a forward-facing position, as described herein. Put another way, the recline frame 400 may be operatively attached to the base 300 (e.g., to the receiving portion 310 of the base 300, such as is illustrated in FIG. 10B) and may support the seat shell 200 thereon such that the seat shell 200 and recline frame 400 are collectively capable of rotation relative to the base 300.

The recline frame 400 may also be configured to permit the seat shell 200 to recline with respect to the base 300. For example, the seat shell 200 may travel (e.g., slidably or otherwise) along a recline path defined by the recline frame 400 (e.g., defined by one or more tracks of the recline frame 400). In this way, the complementary shapes of the seat shell 200 and the receiving portion 310 of the base 300 may advantageously assist in smooth travel of the seat shell 200 as the seat shell 200 is reclined with respect to the base 300. In particular examples, the recline frame 400 may assist in ensuring that a substantially constant gap is maintained between the seat shell 200 and the receiving portion 310 of the base 300 such that the interface between the seat shell 200 and the base 300 is maintained as the seat shell 200 is rotated and/or reclined with respect to the base 300, including as the seat shell 200 is rotated with respect to the base 300 while in a reclined position or upright position. This advantageously allows the seat shell 200 to be reclined and/or rotated with respect to the base 300 without any need to remove or detach the seat shell 200 from the base 300 or to uninstall or reinstall the seat shell 200 onto the base 300, including allowing the seat shell 200 to be rotated with respect to the base 300 while in a reclined position or upright position.

With reference now to FIGS. 10B-12C, the recline frame 400 may include a pair of upper tracks and/or a pair of lower tracks that each engage with at least one recline structure on the seat shell 200 to assist in positioning the seat shell 200 in discrete reclined or upright positions with respect to the base 300, as described herein. In the examples illustrated in FIGS. 10-12C, the pair of upper tracks may be a pair of upper linear tracks 410, and the pair of lower tracks may be a pair of lower linear tracks 420, although other examples of the disclosure are not so limited. Each of the upper and lower linear tracks 410, 420 may generally be formed as an elongate track such that a structure inserted (e.g., upper recline structure or lower recline structure on the seat shell 200) therein or therethrough may generally travel along the elongate track. Particularly, each of the upper and lower linear tracks 410 and 420 may include a non-curved portion that engages with the seat shell 200. Using linear tracks to change the angle of the seating surface as the seat shell 200 with respect to the base 300 may provide for a stronger interface between the seat shell 200 and base 300 in comparison to conventional, arcuate recline tracks.

In some aspects, the individual ones of the pair of upper linear tracks 410 are generally positioned directly across from one another (e.g., a first upper linear track positioned on a right side of a vertical midline of the seat shell 200 and a second upper linear track positioned on a left side of the vertical midline) and, in some aspects, are generally parallel to one another. Similarly, the individual ones of the pair of lower linear tracks 420 are likewise generally positioned directly across from one another and, in some aspects, are generally parallel to one another. In some examples, the upper linear tracks 410 are connected to or integrally formed with the lower linear tracks 420. As shown in FIGS. 10A and 10B, there may be curved track portions connecting the upper linear tracks 410 and the lower linear tracks 420. In other aspects, the upper linear tracks 410 may be separated from the lower linear tracks 420 such that the only connections between the upper linear tracks 410 and the lower linear tracks 420 is the seat shell 200 and/or base 300.

Each of the upper linear tracks 410 may be configured to receive the upper rod 210 of the seat shell 200 therein. In particular constructions, one of the upper linear tracks 410 may be configured to receive a first end of the upper rod 210 therein, and another of the upper linear tracks 410 may be configured to receive a second, opposite end of the upper rod 210 therein. More particularly, each of the upper linear tracks 410 may have an elongate, linear channel 412 (either extending partially through the body of the upper linear tracks 410 or completely through the body of the upper linear tracks 410), and the ends of the upper rod 210 may be received within the channels 412. The upper rod 210 and the upper linear tracks 410 may interface with one another such that the upper rod 210 is adapted for linear translation along each of the upper linear tracks 410 as the seat shell 200 is selectively reclined with respect to the base 300. Translation of upper rod 210 within upper linear tracks 410 advantageously allows the seat shell 200 to be reclined with respect to the base 300 without any need to remove or detach the seat shell 200 from the base 300 or to uninstall or reinstall the seat shell 200 onto the base 300.

Each of the lower linear tracks 420 may be configured to interface with the lower rod 220 of the seat shell 200 so that the lower rod 220 is adapted for linear translation along each of the lower linear tracks 420 as the seat shell 200 is selectively reclined with respect to the base 300. In examples illustrated, each of the lower linear tracks 420 may define a plurality of openings 424 that each generally operates such that a structure inserted therein or therethrough is retained therein. In particular, each opening or pair of openings (i.e., an opening on one lower track and an aligning opening on the other lower track) may define a discrete recline position for the seat shell 200 (e.g., an upright position, a fully-reclined position, an intermediate-reclined position). For example, in the example illustrated in FIGS. 11A-12C, six openings 424 are defined in each of the lower linear tracks 420, which corresponds to six discrete recline positions (e.g., an upright position, a fully-reclined position, and four intermediate-reclined positions). The openings 424 within a given one of the lower linear tracks 420 are generally spaced apart from one another (e.g., equidistantly spaced apart from one another). Generally, the one or more openings (e.g., pair of openings) defined at one of the extreme ends of a series of openings along a track corresponds to and defines an upright position, and the one or more openings (e.g., pair of openings) defined at the opposite extreme end corresponds to and defines a fully-reclined position. The remaining openings (e.g., pairs of openings) disposed between the extreme ends correspond to and define intermediate-reclined positions. Each of the intermediate-reclined positions and the fully-reclined position may all be considered reclined positions.

Figure 11A:
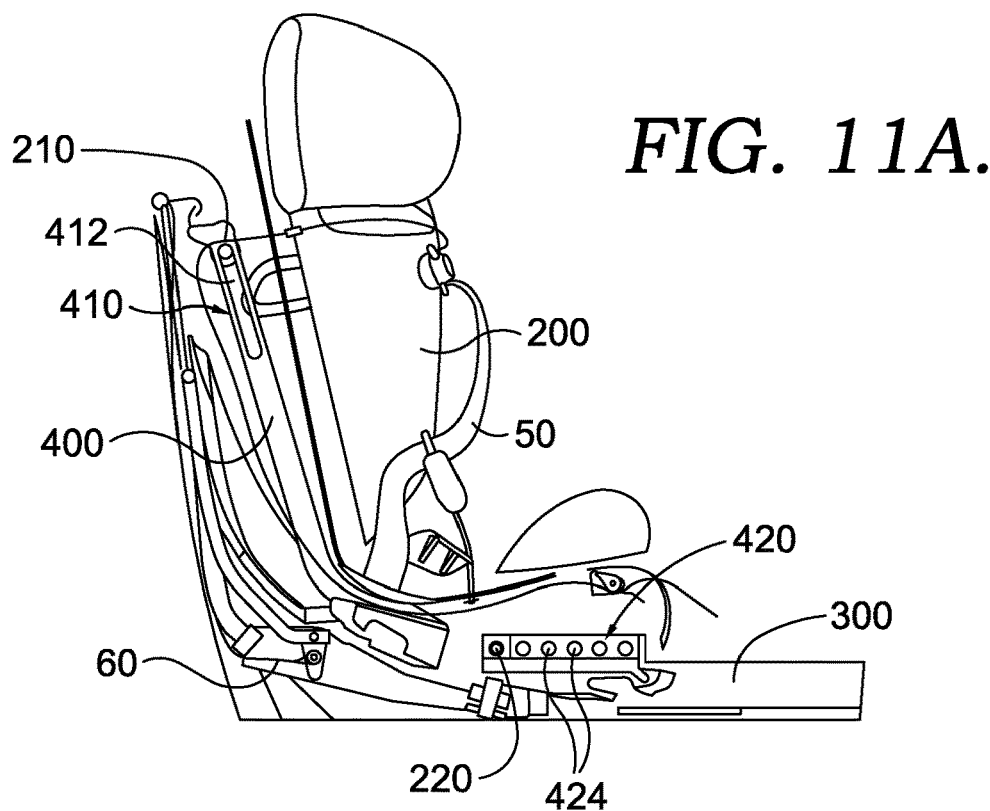
FIG. 11A is a side cross-sectional view of a child car seat in a forward-facing position in accordance with the disclosure, with the seat shell in an upright position with respect to the base.
Figure 11B:
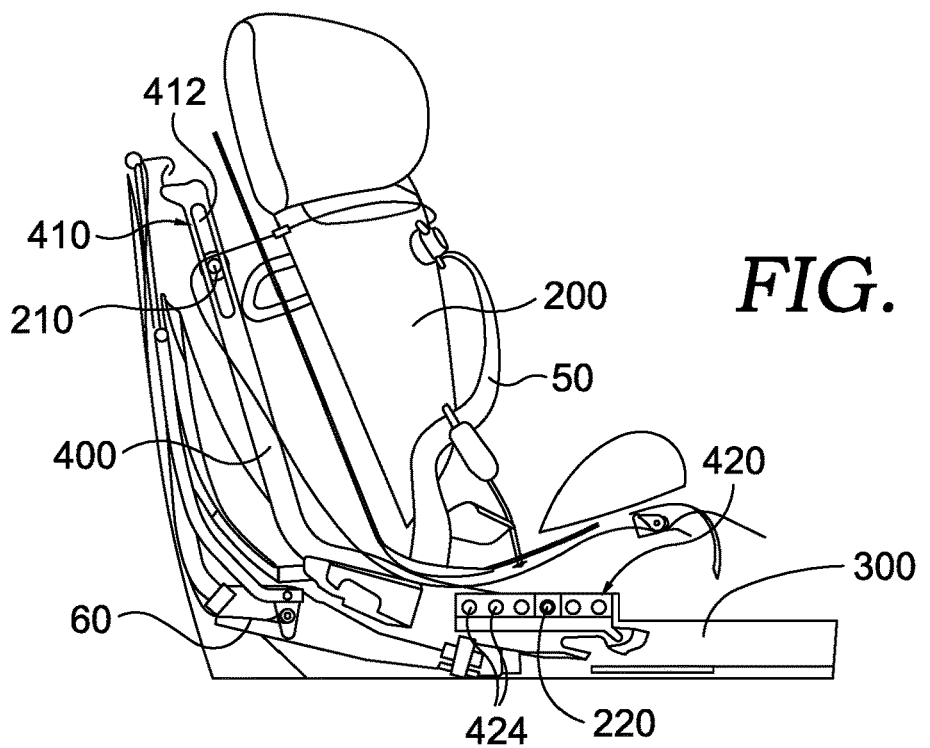
FIG. 11B is a side cross-sectional view of the child car seat of FIG. 11A in a forward-facing position, with the seat shell in an intermediate reclined position with respect to the base.
Figure 11C:
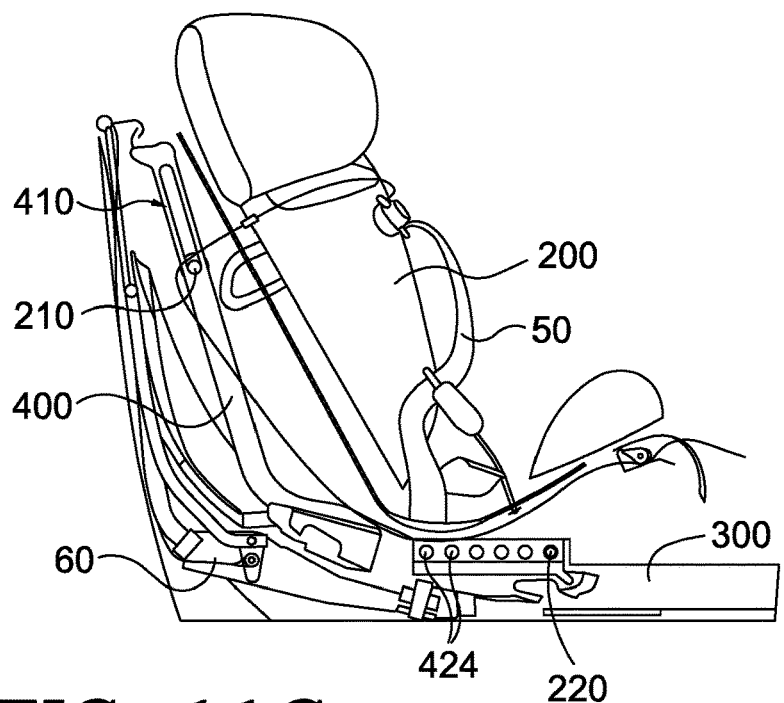
FIG. 11C is a side cross-sectional view of the child car seat of FIG. 10A in a forward-facing position, with the seat shell in a fully reclined position with respect to the base.
Figure 12A:
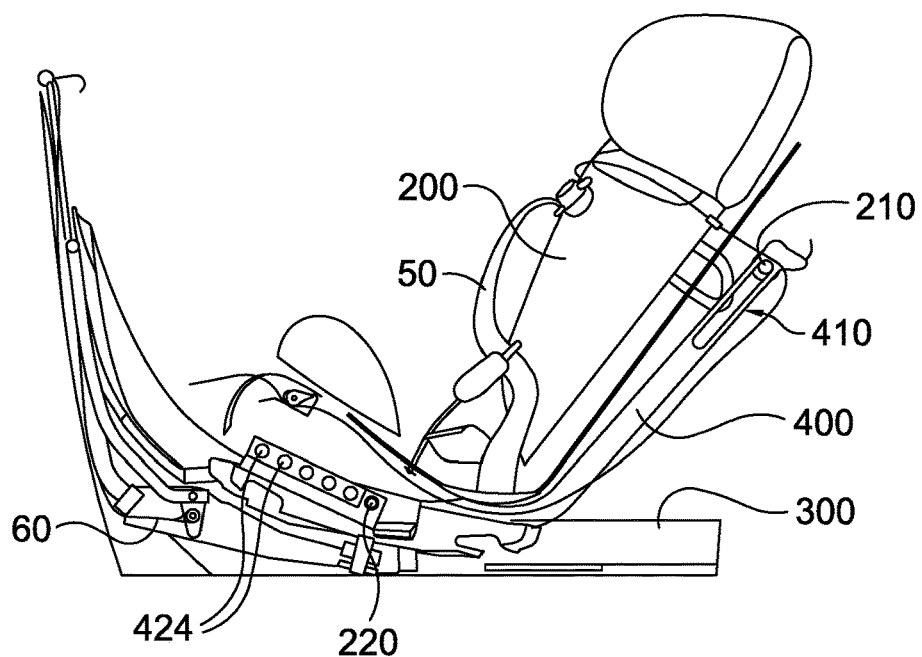
FIG. 12A is a side cross-sectional view of the child car seat of FIG. 11A in a rearward-facing position, with the seat shell in an upright position with respect to the base.
Figure 12B:
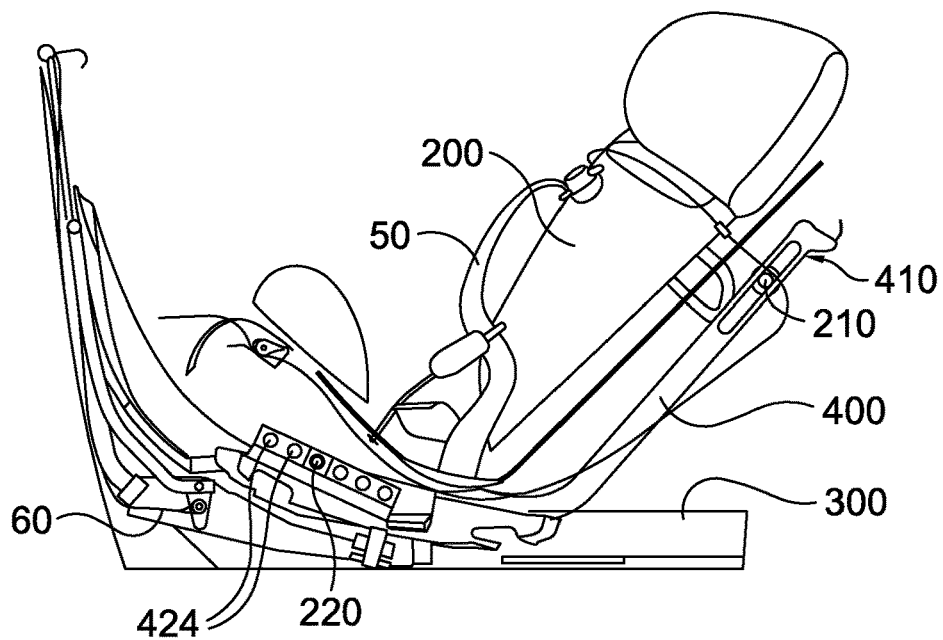
FIG. 12B is a side cross-sectional view of the child car seat of FIG. 11A in a rearward-facing position, with the seat shell in an intermediate reclined position with respect to the base.
Figure 12C:
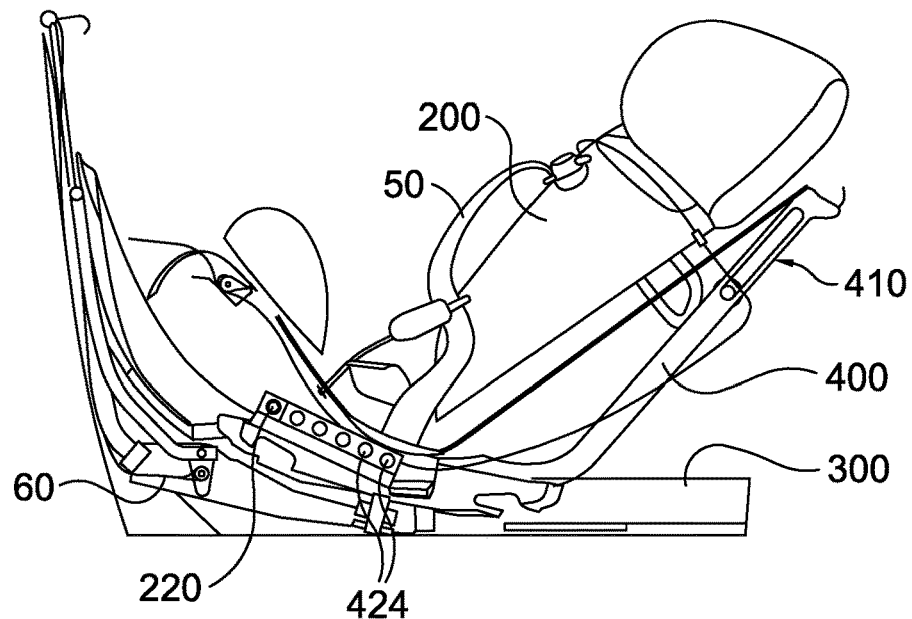
FIG. 12C is a side cross-sectional view of the child car seat of FIG. 11A in a rearward-facing position, with the seat shell in a fully reclined position with respect to the base.

The openings 424 defined in each of the lower linear tracks 420 are configured to receive the lower rod 220 of the seat shell 200 therein or therethrough for selectively positioning the seat shell 200 in a discrete recline position with respect to the base 300. For example, FIG. 11A illustrates the seat shell 200 in the forward-facing position with the seat shell 200 in an upright position with respect to the base 300; FIG. 11B illustrates the seat shell 200 in the forward-facing position with the seat shell 200 in an intermediate reclined position with respect to the base 300; and FIG. 11C illustrates the seat shell 200 in the forward-facing position with the seat shell 200 in a fully reclined position with respect to the base 300. FIG. 12A illustrates the seat shell 200 in the rearward-facing position with the seat shell 200 in an upright position with respect to the base 300; FIG. 12B illustrates the seat shell 200 in the rearward-facing position with the seat shell 200 in an intermediate reclined position with respect to the base 300; and FIG. 12C illustrates the seat shell 200 in the rearward-facing position with the seat shell 200 in a fully reclined position with respect to the base 300.

As can be seen through FIGS. 11A-12C, as the engagement of the lower rod 220 with different openings 424 in the lower linear tracks 420 moves towards a forward end of the seat shell 200 (in either the forward-facing position or the rearward-facing position), the upper rod 210 moves downward along the channels 412 in the upper linear tracks 410. As this happens, the amount of recline of the seat shell 200 relative to the base 300 increases. It can also be seen in comparing FIGS. 11A-11C to FIGS. 12A-12C that the recline frame 400 and the seat shell 200 are at different angles relative to the base 300 in the rearward-facing position compared to the forward-facing position. In particular, within the rearward-facing position, the lower linear tracks 420 are angled more upward from a horizontal plane of the base 300 compared to being in the forward-facing positions. As such, the degrees of recline for the rearward-facing position may be greater than in the forward-facing position.

Figure 13:
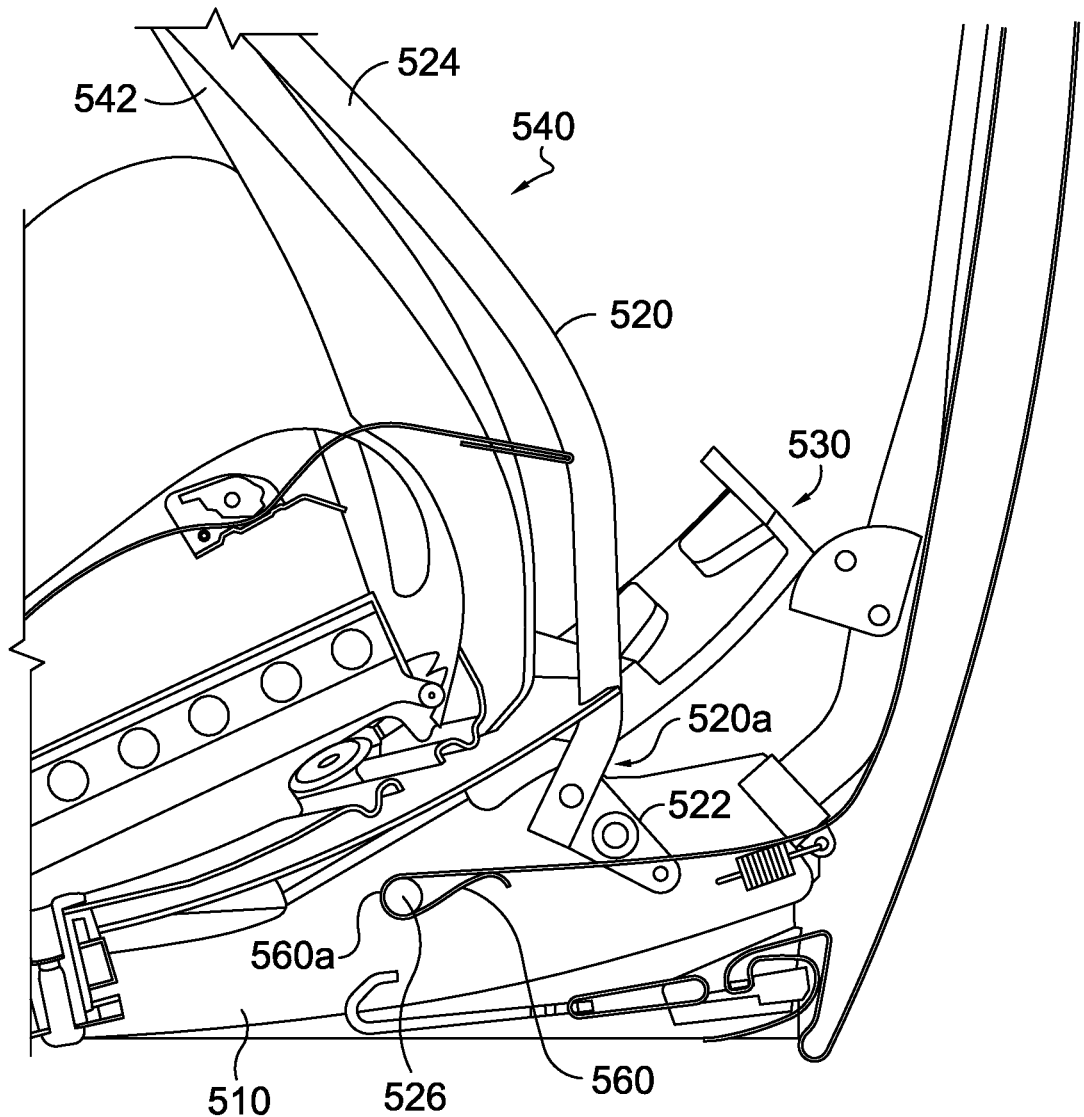
FIG. 13 is a side cross-sectional view of rear portion of a base of a child car seat in accordance with the disclosure, with a tensioner mechanism in a first position relative to the base.
Figure 14A:
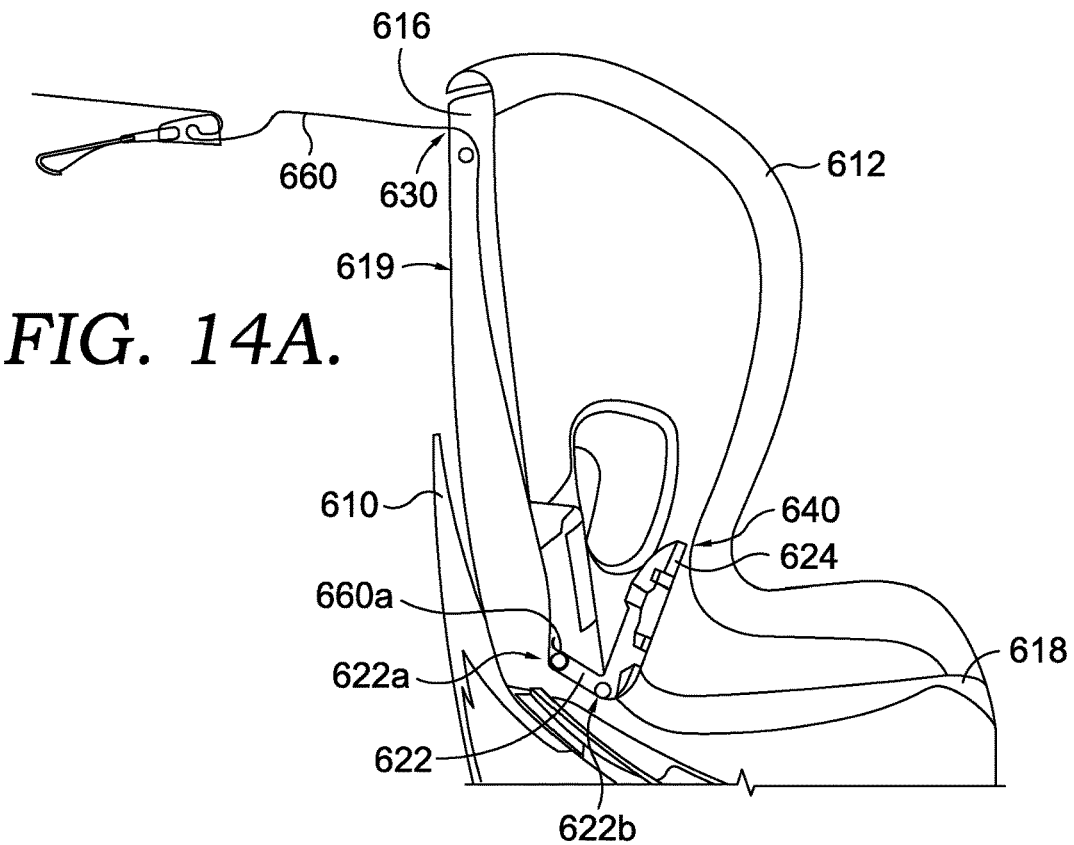
FIG. 14A is a side cross-sectional view of a seat shell and base of a child car seat in accordance with the disclosure, with a tensioner mechanism in a first position relative to the seat shell.
Figure 14B:
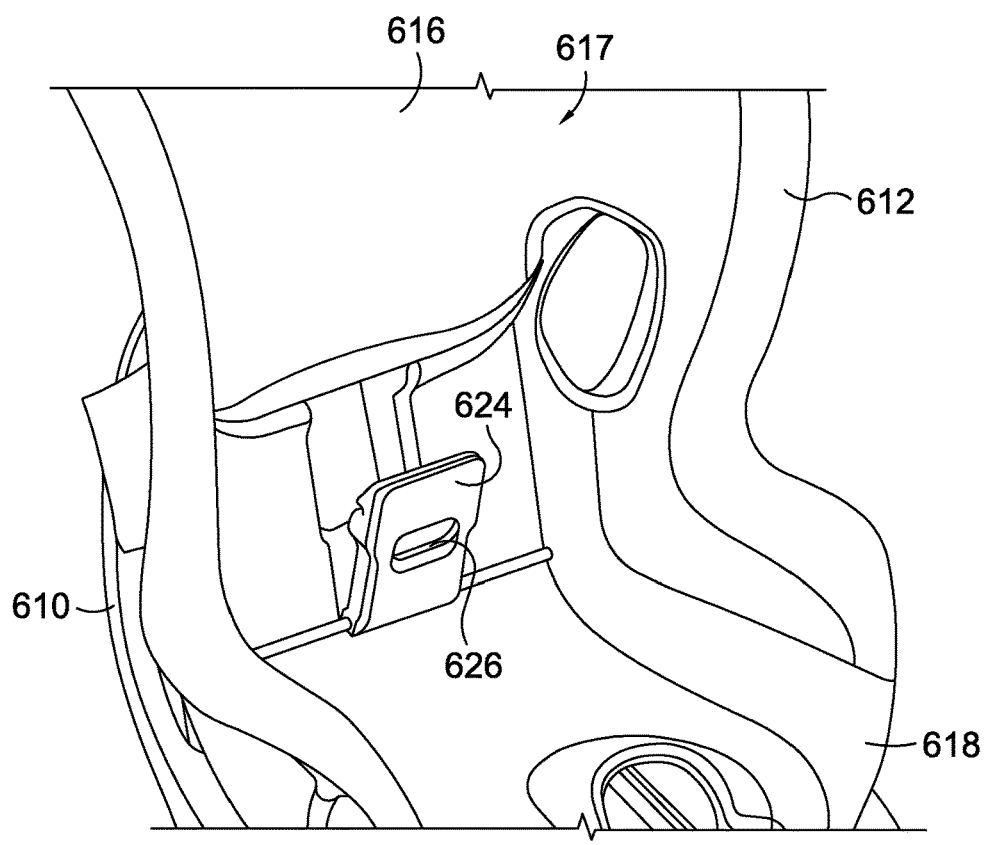
FIG. 14B is a perspective view of the seat shell and base of FIG. 14A, with the tensioner mechanism in the first position relative to the seat shell.
Figure 15A:
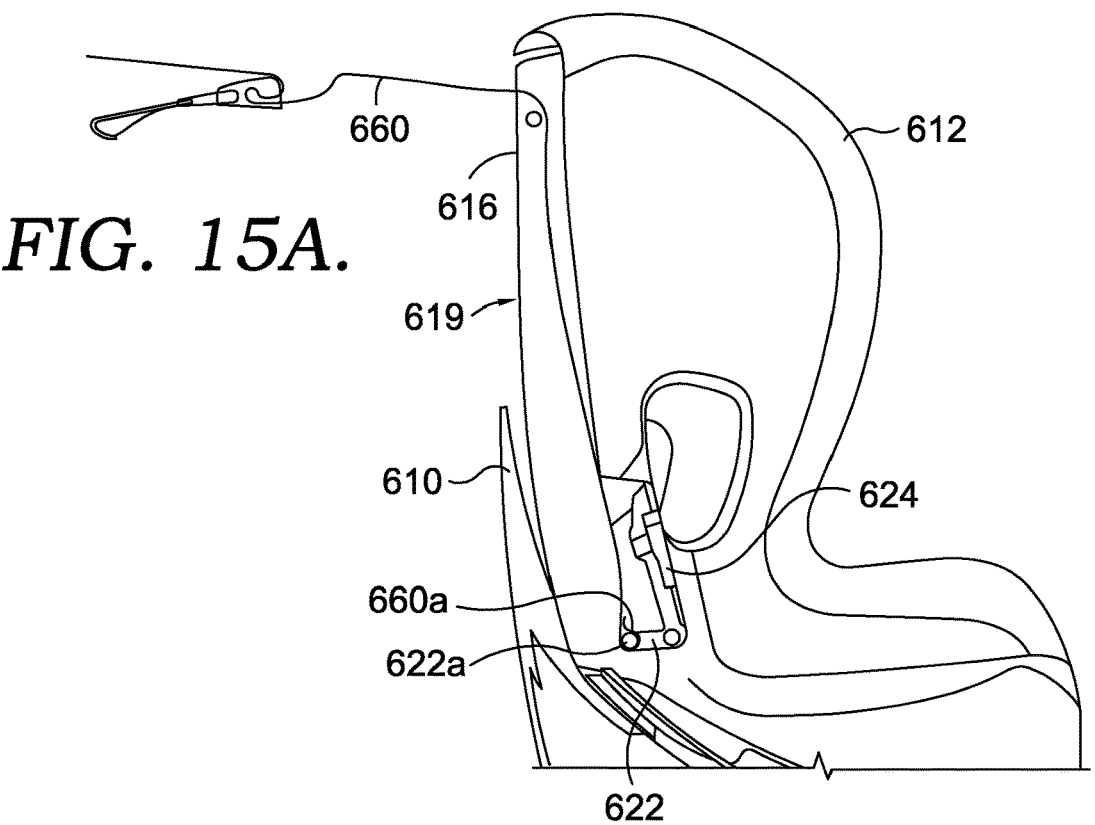
FIG. 15A is a side cross-sectional view of a seat shell and base of FIG. 14A, with the tensioner mechanism in a second position relative to the seat shell.
Figure 15B:
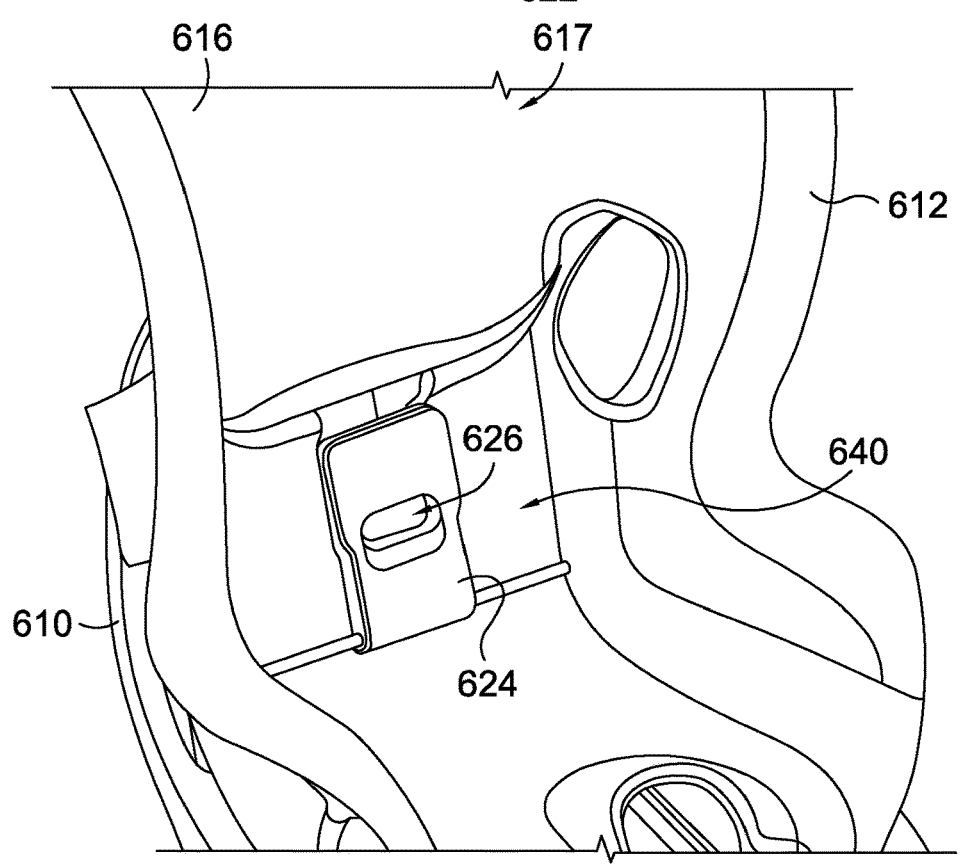
FIG. 15B is a perspective view of the seat shell and base of FIG. 13A, with the tensioner mechanism in the second position relative to the seat shell.

With specific reference to FIG. 13, an alternative tensioner mechanism 540 is illustrated. The tensioner mechanism 540 depicted in FIG. 13 may be used in a car seat with the same features and functions of car seat 10 (and the components thereof) except as otherwise described with respect to the alternative tensioning action described with respect to FIG. 13. As such, the details of such features may apply to the embodiment shown in FIG. 13 without being repeated here in the interests of concision and brevity.

In FIG. 13, the tensioner mechanism 540 may include a bar 520 attached to a panel 542 as described with respect to the bar 320 and panel 342. Further, some aspects of the tensioner mechanism 540 may omit the panel 342.

In this example, the bar 520 includes a proximal end 520a that is generally positioned within the cavity 530 of the base 510 and is generally opposite a distal end (not seen in the view in FIG. 13) of the bar 520. Additionally, the proximal end 60a of the tether 60 may be attached to (e.g., anchored to) an anchor structure 526 of the base 300 that is located forward of the proximal end 520a of the bar 520. The tether 60 may be anchored or otherwise attached to the anchor structure 526 in the base 510 by any desired means to suit a particular application. By way of non-limiting example, the anchor structure 526 may be a bar or elongate structure within the base 510 and the proximal end 60a of the tether 60 may be attached to the anchor structure 526 by being wrapped around the bar or elongate structure.

In such examples, the tensioner mechanism 540 (the bar 520 and, in some aspects, the panel 542) is selectively moved (e.g., rotated) between the first and second positions as described above with respect to tensioner mechanism 340, thereby engaging and tensioning the tether 60. More specifically, as the bar 520 is moved from the first position depicted in FIG. 13 to the second position, the proximal end 520a of the bar 520 pushes downward on a part of the tether 60 that is rearward (i.e., closer to the rear end of the base 300) of where the tether 60 is secured to the anchor structure 526, which increases the tension of the tether 60. In the illustrated example, the proximal end 520a of the bar 520 includes a projection 522 that pushes down on the tether 60. The portion of the tether 60 that is pushed down by the proximal end 520a of the bar 520 may be unsecured to the bar 520 or may be attached to the proximal end 520a of the bar 520. In some aspects, the proximal end 520a of the bar may also push down on a safety belt within the cavity 530, similar to safety belt 50, to also apply tension on the safety belt.

Turning now to FIGS. 14A-15B, another alternative tensioner mechanism 640 is depicted. The tensioner mechanism 640 depicted in FIGS. 14A-15B may be used in a car seat with the same features and functions of car seat 10 (and the components thereof) except as otherwise described with respect to the alternative tensioning action described with respect to FIGS. 14A-15B. As such, it will be appreciated by those skilled in the art that various aspects of car seat 10 and components thereof, including base 300, seat shell 200, tether 60, and tensioner mechanism 340 are generally applicable to the examples discussed with respect to FIGS. 14A-15B unless indicated otherwise and are not repeated here in the interests of concision and brevity.

In this embodiment illustrated in FIGS. 14A-15B, the tensioner mechanism 640 may be located within a seat shell 612 instead of a base 610. Additionally, a proximal end 660a of a tether 660 may be attached within the seat shell 612. In this example, the tether 660 is attached within a back portion 616 of the seat shell 612, which may comprise the back portion 616 configured to support a child occupant's back and a seat portion 618 configured to support a child occupant's seat. The tensioner mechanism 640 is pivotally attached to the back portion 616, and part of the tether 660, such as the proximal end 660a, is attached to the tensioner mechanism 640 so that movement of the tensioner mechanism 640 causes displacement of the tether 660 that either increases or decreases tension of the tether 660.

More specifically, the tensioner mechanism 640 is movable relative to the back portion 616 of the seat shell 612 between the first and second positions similar to the previously described movement of the tensioner mechanism 340 between the first and second positions relative to the base 300. In the first position (referring to FIGS. 14A and 14B), also referred to in some cases as an open position, the tensioner mechanism 640 does not engage or tension the tether 660 within the seat shell 612. In the second position (referring to FIGS. 15A and 15B), also referred to in some cases as a closed position, the tensioner mechanism 640 engages and tensions the tether 660 within the seat shell 612. The tensioner mechanism 640 may be pivotally coupled to the back portion 616 of the seat shell 612 so that the tensioner mechanism 640 can be selectively moved between the first and second positions relative to the seat shell 612 by rotating the tensioner mechanism 640 relative to the seat shell 612 between the first and second positions. As the tensioner mechanism 640 is selectively moved between the first and second positions relative to the seat shell 200, the tether 60 (attached to the tensioner mechanism 640) may be displaced toward or away from a forward end of the seat shell 200.

In the example shown in FIGS. 14A-15B, the tensioner mechanism 640 includes a lever portion 624 and an anchor portion 622. The lever portion 624 may be accessible from a forward side 617 of the back portion 616 of the seat shell 612. When in the second position (referring to FIGS. 15A-15B), the lever portion 624 may be completely or substantially flush with the rest of the forward side 617 of the back portion 616. The anchor portion 622 of the tensioner mechanism 640 extends through the body of the back portion 616 and towards a back side 619 of the back portion 616. In one example, the back portion 616 and anchor portion 622 generally form an L-shape structure, but other aspects are not so limiting.

The anchor portion 622 has a proximal end 622b and a distal end 622a. The proximal end 622b may be secured to the lever portion 624 and the distal end 622a may be secured to the tether 660. The tether 660 may be attached to the tensioner mechanism 640 by any desired means to suit a particular application. By way of non-limiting example, the proximal end 60a of the tether 60 may wrapped around a bar or other structure at the distal end 622a of the anchor portion 622 of the tensioner mechanism 640. It is contemplated that, in other aspects, the proximal end 660a of the tether 660 may be secured to another portion of the seat shell 612 in a similar manner in which the tether 560 was secured to another portion of the base 510 described with respect to FIG. 13.

As depicted, the tether 660 may be threaded through an opening 630 in a back side 619 of the back portion 616 of the seat shell 612 and attached to the anchor portion 622 of the tensioner mechanism 640 at a location between the back side 619 and the forward side 617 of the back portion 616. When the lever portion 624 of the tensioner mechanism 640 is moved from the first position (FIGS. 14A-14B) to the second position (FIGS. 15A-15B), the distal end 622a of the anchor portion 622 is moved downward (i.e., towards the base 610), which increases the tension of the tether 660. In some embodiments, the distal end 622a of the anchor portion 622 is moved towards the forward end of the seat shell 612 when in the second position, and consequently, the tether 660 is also moved towards the forward end of the seat shell 612, which also increases the tension of the tether 660.

In some aspects, the tensioner mechanism 640 may have a slot 626 usable for a handle. In this way, a user may grasp the tensioner mechanism 640 via the slot 626 to move the tensioner mechanism 640 between the first and second positons. As illustrated, the slot 626 may be formed in the lever portion 624 of the tensioner mechanism 640. Further, the slot 626 may extend completely or only partially through the thickness of the lever portion 624.

Additionally, in some aspects, the tensioner mechanism 640 may be configured to also engage and tension a safety belt within the seat shell 612, similar to safety belt 50 being engaged and tensioned within the base 300. Tensioning of the safety belt by the tensioner mechanism 640 may be done at the same time (i.e., simultaneously) as the tensioning of the tether 660 by the tensioner mechanism 640.

While particular examples have been described, it is not intended that the claims be limited thereto, as it is intended that the claims be as broad in scope as the art will allow and that the specification be read likewise. That is, the foregoing description of specific examples will so fully reveal the general nature of the disclosure that others may, by applying knowledge within the skill of the art, readily modify and/or adapt for various applications such specific examples, without undue experimentation, without departing from the general concept of the present disclosure. Therefore, such adaptations and modifications are intended to be within the meaning and range of equivalents of the disclosed examples, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It will be appreciated by those of ordinary skill in the art that the components, method steps and materials illustrated above may be varied by substitution of equivalent components, steps and materials capable of performing the same functions. It will also be appreciated by one of ordinary skill in the art that sizes and strengths of the components may be scaled up or down as required for specific purposes. The claims hereof are intended to encompass all such equivalent components, method steps and scales.

What is claimed is:

1. A child car seat configured to be installed in an associated vehicle using a safety belt of the associated vehicle and a top tether, the child car seat comprising:
   a seat shell supported on a base; and
   a tensioner mechanism configured to engage and tension each of the safety belt of the associated vehicle and the top tether, the tensioner mechanism movable relative to at least one of the seat shell and the base between (a) a first position in which the tensioner mechanism does not engage or tension either of the safety belt of the associated vehicle and the top tether, and (b) a second position in which the tensioner mechanism engages and tensions each of the safety belt of the associated vehicle and the top tether.

2. The child car seat of claim 1, wherein:
   the base defines a cavity configured to receive the safety belt of the associated vehicle and the top tether therein; and
   the tensioner mechanism is pivotally attached to the base and is rotatable between the first and second positions relative to the base.

3. The child car seat of claim 2, wherein the tensioner mechanism includes a panel that at least partially covers the cavity in the second position, the panel having a proximal end attached to the base and a distal end opposite the proximal end.

4. The child car seat of claim 3, wherein the base includes a receiving portion interfacing with the seat shell and a backing portion extending upwardly from the receiving portion, the panel defining at least a portion of the backing portion in the second position.

5. The child car seat of claim 4, wherein, in the second position, the distal end of the panel is contiguous with the backing portion of the base and the panel is positioned substantially flush with the backing portion of the base so as to collectively provide a substantially smooth backing surface.

6. The child car seat of claim 2, wherein the seat shell is rotatably supported on the base such that the seat shell is selectively positionable on the base in at least a rearward-facing position and a forward-facing position.

7. The car seat of claim 6, wherein each of the safety belt of the associated vehicle and the top tether are configured to remain stationary as the seat shell is rotated with respect to the base.

8. The car seat of claim 2, wherein, in the second position, the tensioner mechanism engages and tensions each of the safety belt of the associated vehicle and the top tether within the cavity as the safety belt of the associated vehicle extends through the cavity along a first direction and the top tether extends through the cavity along a second direction substantially orthogonal to the first direction.

9. The car seat of claim 1, wherein the base includes:
a receiving portion interfacing with the seat shell and a backing portion extending upwardly from the receiving portion; and
an aperture defined at and upper end of the backing portion, the top tether passing through the aperture and extending into a cavity defined by the base, the cavity configured to receive the safety belt of the associated vehicle and the top tether therein.

10. The child car seat of claim 1, further comprising a recline frame operatively attaching the seat shell to the base and configured to permit the seat shell to recline with respect to the base, wherein each of the seat shell and the recline frame are rotatably supported on the base and selectively positionable on the base in at least a rearward-facing position and a forward-facing position, the recline frame further configured to permit the seat shell to recline with respect to the base.

11. The child car seat of claim 10, wherein the recline frame includes:
a pair of upper linear tracks, each of the upper linear tracks configured to receive an upper recline structure of the seat shell therein, the upper recline structure adapted for linear translation along each of the upper linear tracks as the seat shell is reclined with respect to the base; and
a pair of lower linear tracks, each of the lower linear tracks defining a plurality of openings configured to selectively receive a lower recline structure of the seat shell for selectively positioning the seat shell in a discrete recline position.

12. The car seat of claim 1, wherein:
the top tether is anchored to the seat shell; and
the tensioner mechanism is pivotally attached to the seat shell and is rotatable between the first and second positions relative to the seat shell.

13. The car seat of claim 1, wherein the tensioner mechanism includes an anchor portion positioned within a cavity of the base, and the top tether is attached to the anchor portion such that (a) the anchor portion and the top tether are displaced toward a forward end of the base as the tensioner mechanism is moved from the first position to the second position, and (b) the anchor portion and the top tether are displaced away from the forward end of the base as the tensioner mechanism is moved from the second position to the first position.

14. The car seat of claim 1, wherein at least part of the top tether is attached to an anchor structure on the base that does not move when the tensioner mechanism is moved from the first position to the second position, and wherein, the tensioner mechanism displaces a portion of top tether positioned more rearward than the anchor structure when the tensioner mechanism is moved from the first position to the second position.

15. A child car seat configured to be installed in an associated vehicle using a safety belt of the associated vehicle and a top tether, the child car seat comprising:
a base defining a cavity configured to receive the safety belt of the associated vehicle and the top tether therein;
a seat shell supported the base; and
a tensioner mechanism pivotally attached to the base, the tensioner mechanism being rotatable relative to the base between (a) a first position in which the tensioner mechanism is pivoted away from the base such that a distal end of the tensioner mechanism is spaced apart from the base and the tensioner mechanism does not engage or tension either of the safety belt of the associated vehicle and the top tether, and (b) a second position in which the distal end of the tensioner mechanism is contiguous with the base and the tensioner mechanism engages and tensions each of the safety belt of the associated vehicle and the top tether within the cavity.

16. The child car seat of claim 15, wherein base includes a receiving portion that supports the seat shell and a backing portion that extends upward from the receiving portion, wherein the tensioner mechanism includes a panel that is pivotally attached to a backing portion of the base.

17. The child car seat of claim 15, wherein the seat shell is rotatably supported on the base such that the seat shell is selectively positionable on the base in at least a rearward-facing position and a forward-facing position.

18. The car seat of claim 17, wherein the tensioner mechanism includes a panel that is pivotally attached to a backing portion of the base and wherein:
the panel is generally accessible and capable of being selectively moved between the first and second positions when the seat shell is in the rearward-facing position; and
the panel is generally inaccessible and incapable of being selectively moved between the first and second positions when the seat shell is in the forward-facing position.

19. A child car seat configured to be installed in an associated vehicle, the child car seat comprising:
a base;
a seat shell; and
a recline frame operatively attaching the seat shell to the base, the recline frame configured to permit the seat shell to recline with respect to the base, the recline frame including:
a pair of upper linear tracks, each of the upper linear tracks configured to receive an upper recline structure of the seat shell therein, the upper recline structure adapted for linear translation along each of the upper linear tracks as the seat shell is reclined with respect to the base; and a pair of lower linear tracks, each of the lower linear tracks defining a plurality of openings configured to selectively receive a lower recline structure of the seat shell for selectively positioning the seat shell in a discrete recline position; and a tensioner mechanism configured to engage and tension at least one of a safety belt of the associated vehicle and a tether of the child car seat, wherein in at least one recline position the tensioner mechanism is accessible and in at least one other recline position the tensioner mechanism is not accessible.

20. The child car seat of claim 19, wherein each of the seat shell and the recline frame are rotatably supported on the base and selectively positionable on the base in at least a rearward-facing position and a forward-facing position.

* * * * *

UNITED STATES PATENT AND TRADEMARK OFFICE
CERTIFICATE OF CORRECTION

| | | |
|---|---|---|
| PATENT NO. | : 12,286,039 B2 | Page 1 of 1 |
| APPLICATION NO. | : 17/845567 | |
| DATED | : April 29, 2025 | |
| INVENTOR(S) | : Dingman et al. | |

It is certified that error appears in the above-identified patent and that said Letters Patent is hereby corrected as shown below:

In the Claims

In Column 19, Line 21, in Claim 7, after "The", insert --child--

In Column 19, Line 25, in Claim 8, after "The", insert --child--

In Column 19, Line 32, in Claim 9, after "The", insert --child--

In Column 19, Line 63, in Claim 12, after "The", insert --child--

In Column 20, Line 1, in Claim 13, after "The", insert --child--

In Column 20, Line 11, in Claim 14, after "The", insert --child--

In Column 20, Line 47, in Claim 18, after "The", insert --child--

Signed and Sealed this
Second Day of December, 2025

John A. Squires
*Director of the United States Patent and Trademark Office*